US009691072B2

(12) United States Patent
Linnenbringer et al.

(10) Patent No.: US 9,691,072 B2
(45) Date of Patent: Jun. 27, 2017

(54) METHOD AND SYSTEM FOR GENERATING ELECTRONIC FORMS FOR PURCHASING FINANCIAL PRODUCTS

(75) Inventors: Jean Linnenbringer, Mechanicsville, VA (US); William Hedish, Richmond, VA (US); Jay Ryan, Richmond, VA (US); Mary Jane Watkins, Richmond, VA (US); Matthew Majikes, Richmond, VA (US)

(73) Assignee: Genworth Holdings, Inc., Richmond, VA (US)

( * ) Notice: Subject to any disclaimer, the term of this patent is extended or adjusted under 35 U.S.C. 154(b) by 2095 days.

(21) Appl. No.: 09/953,452

(22) Filed: Sep. 17, 2001

(65) Prior Publication Data
US 2003/0055763 A1 Mar. 20, 2003

(51) Int. Cl.
*G06Q 40/00* (2012.01)
*G06Q 30/02* (2012.01)
*G06Q 40/02* (2012.01)
*G06Q 40/06* (2012.01)

(52) U.S. Cl.
CPC ........... *G06Q 30/02* (2013.01); *G06Q 40/02* (2013.01); *G06Q 40/06* (2013.01)

(58) Field of Classification Search
CPC ........ G06Q 40/00; G06Q 20/22; G06Q 20/29; G06Q 30/02; G06Q 40/02; G06F 17/60
USPC ...................................................... 705/1–50
See application file for complete search history.

(56) References Cited

U.S. PATENT DOCUMENTS

| 5,523,942 | A | * | 6/1996 | Tyler et al. ..................... 705/4 |
|---|---|---|---|---|
| 5,920,847 | A | * | 7/1999 | Kolling et al. ................ 705/40 |
| 6,018,723 | A | * | 1/2000 | Siegel et al. .................. 705/38 |
| 6,151,584 | A | * | 11/2000 | Papierniak et al. ........... 705/10 |
| 6,223,983 | B1 | * | 5/2001 | Kjonaas ................ G06Q 10/10 235/379 |
| 7,689,444 | B2 | | 3/2010 | Atlee et al. |
| 8,161,177 | B2 | * | 4/2012 | Robbins .............. G11B 27/034 348/14.02 |
| 2002/0133440 | A1 | | 9/2002 | Chalke et al. |
| 2002/0138310 | A1 | | 9/2002 | Sagalow |

(Continued)

OTHER PUBLICATIONS

Christopher D. Hoffman, Investigative Interviewing: Strategies and Techniques, Aug. 2005, International Foundation for Protection Officers, web, 1-18.*

*Primary Examiner* — Marissa Liu
(74) *Attorney, Agent, or Firm* — Hunton & Williams LLP

(57) ABSTRACT

The present invention provides a system and method for generating electronic forms for purchasing a financial product, such as a variable annuity. The present invention enables a user (e.g., an agent, a seller, etc.) to access a web-based application where pre-interview data of a client may be entered. The web-based application may then setup interview transaction templates based on various rules and other considerations for gathering appropriate information from a client. The transaction may be stored on the user's desktop device which may be used to remotely gather interview data from a client. During the interview process, the user may collect data offline. At the end of the interview process, the user may reconnect with the web-based application for transmitting data to a server. The server may then generate the appropriate forms based on the interview data gathered remotely and/or other sources of information.

6 Claims, 30 Drawing Sheets

(56) References Cited

U.S. PATENT DOCUMENTS

2002/0138407 A1\* 9/2002 Lawrence et al. ............... 705/38
2003/0018481 A1 1/2003 Zhou et al.
2003/0172025 A1\* 9/2003 Gallina ............................ 705/38
2004/0186743 A1\* 9/2004 Cordero, Jr. ............. G09B 7/00
  705/321

\* cited by examiner

Welcome

Confirm the Agent Information

Confirm the
Agent Information

Agency Name : name
Agent Name  : agency name1
Address     : addr1
              addr2
              city
              st
              zip

} 1610

Writing Code : age000003

If update to information is necessary,
please call (866) 999-9999

| State | Valid From | Expires On |
|-------|------------|------------|
| s3    | 12-May-1975 | 20-May-1975 |

1620        1622         1624

Split Commission
1630

Cancel                < Back    Next >

FIG. 16

Welcome

Split Commission Entry

Select additional agent and enter commission split percentages

| Agent and Writing Relationship | | | | Percentage | |
|---|---|---|---|---|---|
| 1710 | Peter, Sam | Peter & Paul Agency | Stock Brokerage | 75 | 1712 |
| 1720 | 1. name | agency name2 | age000002 | s2 ∨ | 25 | 1722 |

Total 100

Cancel  < Back  Next >

FIG. 17

Welcome

Forms Package Selection

Provide initial transaction data needed to determine the necessary application package Application Package Selection Form

| | | |
|---|---|---|
| State of Sale | California ▼ | 1810 |
| State of Delivery | California | 1812 |
| Product | p003 ▼ | 1814 |
| Plan Type | plan1 ▼ | 1816 |
| Funding | funding 1 ▼ | 1818 |
| Expected Premium | | 1820 |

Annuitant DDB    Jan    1    1910
       1822

Cancel                    < Back    Next >

FIG. 18

Insurer: ; Agent Name: ; Product: ; Plan: 1910

Variable Annuity & Application

Current Entry Screen: Product & Setup Interview

| City of Sale 1912 | State of Sale 1914 VA | Date of Sale 1916 04/27/2001 | Annuitant's Date of Birth 1918 04/01/1943 | Expected Total Premium 1920 $15,000.00 |

No Basic Riders required (Annuitant is under 75) 1922

Annual Estate Proctector

Annuitant is under 75 - do not select Optional Riders 1924

▶

| Plan Type 1926 | Transfer Type 1928 | N/A |

Show Plan Type from Interview

Please select the Type of Ownership 1930

[ Help ]   [ Previous ]   [ Next ]

FIG. 19

1910  Insurer:  ; Agent Name:  ; Product:  ; Plan:

Variable Annunity & Application

Current Entry Screen: Natural Owner

Interview

Primary Owner Name 2010

| Gender | | Date of Birth 2012 | 2014 | SSN | 2016 | Phone Number | 2018 |
| Street Address | 2020 | | | City | 2022 | State 2024 | ZIP 2026 |

2028  Individual or Joint Ownership? ▸

Primary Owner Name 2030

| Gender | 2032 | Date of Birth | 2034 | SSN | 2036 | Phone Number | 2038 |
| 2040 Joint Owner Address same as Primary Owner Address? |
| Street Address | 2042 | | | City | 2044 | State 2046 | ZIP 2048 |

Help  Previous  Next

FIG. 20

Variable Annunity & Application

Insurer:  ; Agent Name:  ; Product:  ; Plan:

Current Entry Screen: Interview

Annuitant

Is the Annuitant the same as the Owner? 2110

Annuitant Name 2112

Gender 2114   Date of Birth 2116   SSN 2118   Phone Number 2020

Street Address 2122   City 2124   State 2126   ZIP 2128

Joint Annuitants not available 2130

Help    Previous    Next

FIG. 21

Variable Annunity & Application

Insurer: ; Agent Name: ; Product: ; Plan:

Current Entry Screen: Interview
Beneficiary Setup

Please enter the Beneficiary Information Below.

| 2210 | Beneficiary Type 2212 | Beneficiary Name 2214 | Percentage Allocated 2216 |
|---|---|---|---|
| Primary 1 | ▶ | | |
| Primary 2 | ▶ | | |
| Primary 3 | ▶ | | |
| Primary 4 | ▶ | | |
| Primary 5 | ▶ | | |
| Primary 6 | ▶ | | |
| Contingent 1 | ▶ | | |
| Contingent 2 | ▶ | | |
| Contingent 3 | ▶ | | |
| Contingent 4 | ▶ | | |
| Contingent 5 | ▶ | | |

Previous    Next

Help

FIG. 22

Variable Annunity & Application

Insurer:    ; Agent Name:    ; Product:    ; Plan:

Current Entry Screen:    Initial Investment Allocation

Interview

Enter whole percentage of each investment subdivision selected below. Percentages must total 100%.

| 2310 | Fund 2312 | % Allocated 2314 | = $ Amount 2316 | Expected Premium $15,000.00 |
|---|---|---|---|---|
| | | | | $ Balance 2318 |
| | Fixed Fund 1 | ▶ | | |
| | Fixed Fund 2 | ▶ | | |
| | Equity Fund 1 | ▶ | | |
| | Equity Fund 2 | ▶ | | |
| | Equity Fund 3 | ▶ | | |
| | Equity Fund 4 | ▶ | | |
| | Equity Fund 5 | ▶ | | |
| | Equity Fund 6 | ▶ | | |
| | Equity Fund 7 | ▶ | | |
| | Equity Fund 8 | ▶ | | |
| | Equity Fund 9 | ▶ | | |

Help    Previous    Next

FIG. 23

METHOD AND SYSTEM FOR GENERATING ELECTRONIC FORMS FOR PURCHASING FINANCIAL PRODUCTS

BACKGROUND OF THE INVENTION

The present invention relates generally to the field of generating electronic forms relating to financial or other products, in particular, to a method and system for enabling users (e.g., agents, sellers, etc.) to generate forms templates customized to a client based on a web-based pre-interview process where the forms templates may be completed during an interview process with the client which may occur disconnected from the web where a set of forms may be generated based on the interview process and other data.

Financial products offer various benefits to users with different needs. For example, financial products may serve long term purposes, such as retirement security. With the wide range of complex financial products, clients generally lack sufficient knowledge to understand and compare the benefits of such products. Further, procedures to purchase financial products may be confusing and burdensome to a client with little knowledge of the product. Regulatory and other considerations may further complicate an investment decision process. For example, client qualification, appropriate guidelines, state restrictions and other similar factors may be considered.

An example of a useful financial product is an annuity. An annuity is a flexible retirement planning tool which allows a client's retirement savings to increase on an income tax-deferred basis. The client may choose a payout option that best suits the client's need for income during retirement. Annuities may be customized to a client's needs and concerns.

Annuities may include fixed and variable annuities. Both types of annuities offer a variety of contribution and payout options. With a fixed annuity, the premiums paid earn a fixed rate of return from an issuer of the annuity. Payouts are guaranteed at a fixed amount every month or other time period.

A variable annuity offers the advantage of investing with tax-deferred growth of the funds invested. The issuer of the annuity may offer a variety of underlying investment options to which a client can allocate funds. The client can tailor the various options to suit the client's tolerance for risk and desire for potential rewards. In addition, as tax may be deferred until the funds are withdrawn from the annuity, any earnings over the life of the annuity generally compound faster than taxable and other investments.

With a variable annuity, premiums may be invested in stock and bond funds. The value of the annuity and the client's return on premiums invested is directly related to how well the stocks and bonds perform. The type of investment funds selected for the variable annuity depends on the level of risk a particular client is willing to assume. The payout may be a fixed amount each month (or other time period) or a variable payout. The amount of the variable payment may be based on the performance of the underlying funds in the annuity, which may vary. Variable annuities may also offer the option to place funds in fixed-income accounts.

When purchasing an annuity, various payment options may be available. A client may pay once with a single premium, periodically with level-premium amounts, or periodically with flexible-premium amounts.

Other considerations may enter into a client's investment decision process. Such other considerations may include various regulatory issues. For example, some states have implemented a free-look requirement which entitles a client to a free look period after the purchase of a financial product such as an annuity. This free-look period typically enables a client to cancel the annuity and receive a full refund within the free-look period, depending on the specific terms of the client's contract or state law. In addition, a client may be protected by a state guaranty association in the event that the issuer of the annuity has financial troubles. Different states offer varying levels of guarantees.

As annuities and other financial products offer various investment options and may be customized to a client's needs and concerns, the process for determining client qualifications and purchasing a financial product, such as an annuity, is oftentimes complex and overly burdensome. A particular set of forms for purchase of the desired financial product must be properly completed by the client or client representative.

These and other drawbacks exist with current methods and systems.

BRIEF SUMMARY OF THE INVENTION

Advantages of the invention will be set forth in part in the description which follows, and in part will be understood from the description, or may be learned by practice of the invention. The advantages of the invention may be realized and attained by means of the instrumentalities and combinations particularly pointed out in the appended claims.

This invention, in one aspect, includes a method for accessing a set of electronic forms for facilitating a purchase of at least one financial product comprising the steps of accessing a web-based application for enabling a user to provide a financial product to a client; entering pre-interview data for generating a plurality of transaction templates for facilitating client data entry; disconnecting from the web-based application; interviewing the client for gathering interview data as prompted by the transaction templates for purchasing at least one financial product; re-connecting to the web-based application; and transmitting the gathered interview data to a server for enabling the generation of a set of electronic forms for purchasing the financial product.

In another aspect, the invention includes a method for generating a set of electronic forms for facilitating a purchase of at least one financial product comprising the steps of providing a web-based application for enabling a user to provide a financial product to a client; gathering pre-interview data from the user; generating a plurality of transaction templates based on the pre-interview data for facilitating client data entry; enabling the user to gather interview data from a remote client as prompted by the transaction templates for purchasing the at least one financial product during a disconnect stage; enabling the user to establish a connection to the web-based application; and generating a set of electronic forms for purchasing the at least one financial product based on the interview data.

In another aspect, the invention includes a method for accessing a set of electronic forms for facilitating a purchase of at least one product comprising the steps of entering pre-interview data for receiving at least one transaction template; gathering interview data prompted by the transaction template from a remote source wherein the transaction template is stored on a remote user device; and transmitting interview data to a server for generating a set of electronic forms wherein the electronic forms are used to purchase the product.

In another aspect, the invention includes a method for generating a set of electronic forms for facilitating a purchase of at least one product comprising the steps of gathering pre-interview data wherein the pre-interview data is used to generate at least one transaction template; receiving interview data from a remote source as prompted by the transaction template wherein the transaction template is stored on a remote user device; and generating a set of electronic forms based on interview data wherein the electronic forms are used to purchase the at least one product.

In another aspect, the invention includes a system for accessing a set of electronic forms for facilitating a purchase of at least one financial product. The system comprises access means for accessing a web-based application for enabling a user to provide the at least one financial product to a client; input means for entering pre-interview data for generating a plurality of transaction templates for facilitating client data entry; disconnect means for disconnecting from the web-based application; interview means for interviewing the client for gathering interview data as prompted by the transaction templates for purchasing the at least one financial product; reconnect means for re-connecting to the web-based application; and transmission means for transmitting the gathered interview data to a server for generating a set of electronic forms for purchasing the at least one financial product.

In another aspect, the invention includes a system for generating a set of electronic forms for facilitating a purchase of at least one financial product. The system comprises a web-based application for enabling a user to provide the at least one financial product to a client; gathering means for gathering pre-interview data from a user; generation means for generating a plurality of transaction templates based on the pre-interview data for facilitating client data entry; interview means for enabling the user to gather interview data from a remote client as prompted by the transaction templates for purchasing the at least one financial product during a disconnect stage; establishing a connection means for enabling the user to reconnect to the web-based application; and generation means for generating a set of electronic forms for purchasing the at least one financial product based on the gathered interview data.

In another aspect, the invention includes a system for accessing a set of electronic forms for facilitating a purchase of at least one product. The system comprising entering means for entering pre-interview data for receiving at least one transaction template; gathering means for gathering interview data prompted by the at least one transaction template from a remote source wherein the at least one transaction template is stored on a remote user device; and transmission means for transmitting the gathered interview data to a server for generating the set of electronic forms wherein the set of electronic forms is used to purchase the at least one product.

In another aspect, the invention includes a system for generating a set of electronic forms for facilitating a purchase of at least one product. The system comprising gathering means for gathering pre-interview wherein the pre-interview data is used to generate at least one transaction template; receiving means for receiving interview data from a remote source as prompted by the transaction template wherein the transaction template is stored on a remote user device; and generating means for generating the set of electronic forms based on the received interview data wherein the set of electronic forms is used to purchase the at least one product.

The accompanying drawings, which are incorporated in and constitute a part of this specification, illustrate various embodiments of the invention and, together with the description, serve to explain the principles of the invention.

BRIEF DESCRIPTION OF THE DRAWINGS

FIG. 16 is an example of a screen shot for a web-based application for gathering pre-interview data, according to an embodiment of the present invention.

FIG. 17 is an example of a screen shot for a web-based application for gathering pre-interview data, according to an embodiment of the present invention.

FIG. 18 is an example of a screen shot for a web-based application for gathering pre-interview data, according to an embodiment of the present invention.

FIG. 19 is an example of a screen shot for a desktop application for gathering product and setup data, according to an embodiment of the present invention.

FIG. 20 is an example of a screen shot for a desktop application for gathering ownership data, according to an embodiment of the present invention.

FIG. 21 is an example of a screen shot for a desktop application for gathering annuitant data, according to an embodiment of the present invention.

FIG. 22 is an example of a screen shot for a desktop application for gathering beneficiary setup data, according to an embodiment of the present invention.

FIG. 23 is an example of a screen shot for a desktop application for gathering initial investment allocation data, according to an embodiment of the present invention.

DETAILED DESCRIPTION OF THE INVENTION

The present invention provides a system and method for generating a plurality of electronic forms for purchasing a financial product, such as a variable annuity. The present invention enables a user (e.g., an agent, seller, sales agent, etc.) to access a web-based application where pre-interview data may be entered. The web-based application may then set-up a plurality of interview transaction templates based on various rules and other considerations for gathering appropriate information from a client. The transaction templates may be stored on the agent's desktop device which may be used to remotely gather interview data from the client. During the interview process, the agent may collect data offline. At the end of the interview process, the agent may reconnect with the web-based application for transmitting data to a server. The agent may then generate the appropriate forms based on the interview data gathered remotely and/or other sources of information.

Figure 1:
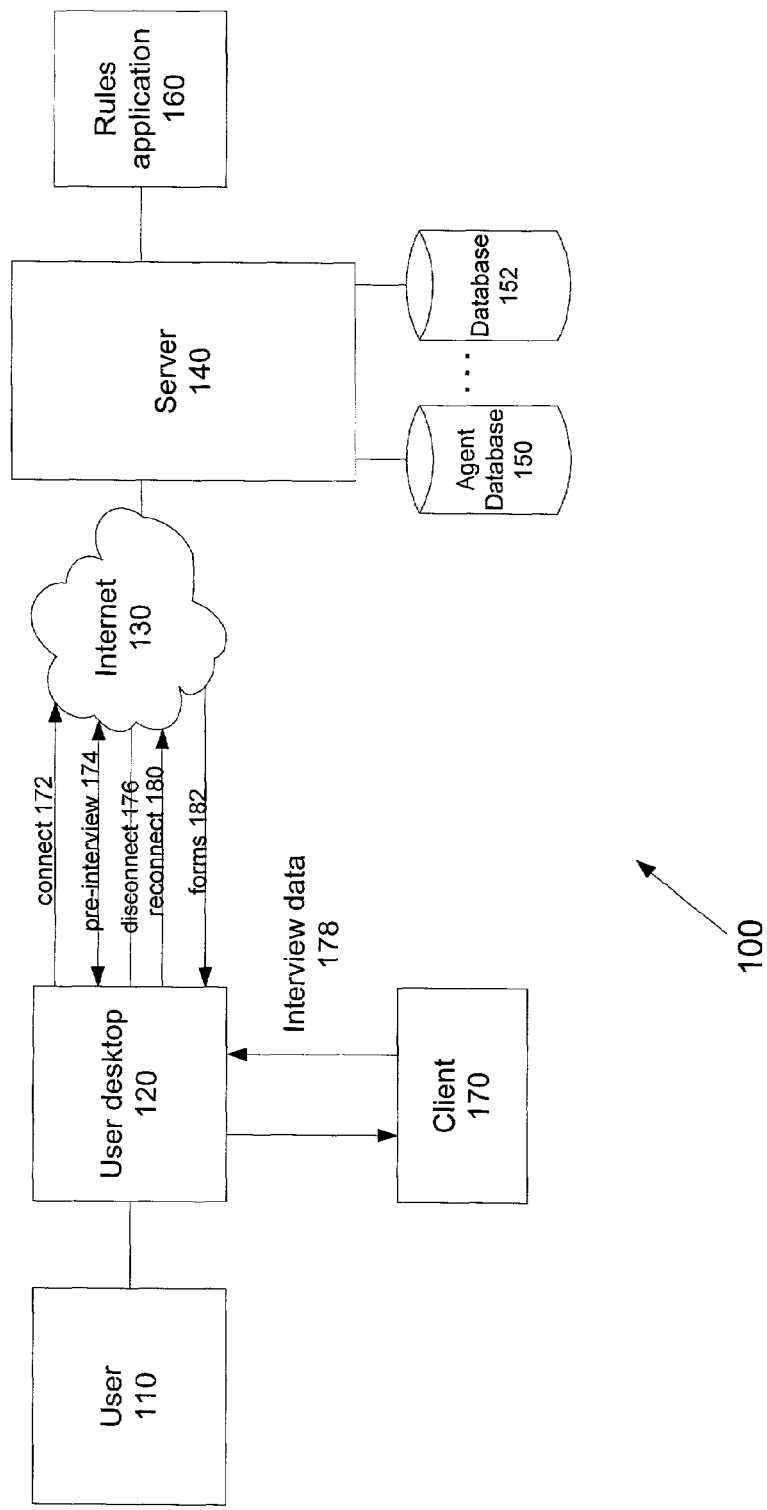
FIG. 1 is an example of a system for generating electronic forms for purchasing financial products, according to an embodiment of the present invention.

FIG. 1 is an example of a system for generating a plurality of electronic forms for purchasing a financial product, according to an embodiment of the present invention. A user 110 (e.g., a sales agent or other representative) may have access to a user desktop 120, which may include a portable or other device capable of electronic communication. For example, the user desktop 120 may include a laptop, a PDA or another portable computing device. The user 110 may access Internet 130 via the user desktop 120 to connect at 172 with a server 140 of the present invention. The user 110 may enter pre-interview data, shown by a connection 174. The server 140 may then generate appropriate transaction templates based on rules via rules application 160 and/or other considerations. User data and other information may be obtained from various databases, such as an agent database 150.

The rules application 160 may include a plurality of tables of various rules that may be used to generate an appropriate set of transaction templates and may be used to identify available options based on client and/or other data. The tables of rules may include an allocation table for identifying funds available by a location (e.g., by a state), by a product and/or other factors. A compensation table may provide one or more compensation choices by a firm, by a product and/or other factors. A custodial table may be used to identify one or more firms that have a custodial agreement with a specific financial product provider. A death benefit table may provide one or more approved riders by a product, by a state, by an annuitant's date of birth and/or other factors. An enhanced fund table may identify one or more rules regarding one or more dollar cost averaging options. An external policy number table may identify one or more firms requiring an external policy number. A firm approval table may identify one or more products which a particular firm has been approved to sell. A funding table may identify one or more methods to fund a specific product, such as a variable annuity. A minimum/maximum table may identify a plurality of maximum premium and/or minimum premium rules by a product, by an annuitant's date of birth or other factors. A plan type table may display one or more qualification types. A product availability table may identify one or more products available by a location, such as a state, and/or other factors. A relationship table may provide a list of approved relationships. A replacement state table may provide a list of states requiring replacement documents, which may include legal notices signed by a client disclosing the nature of a replacement transaction. A restricted state table may provide a list of restricted states, which include states in which a seller is restricted from selling prior to appointment from an insurance carrier. A product age restriction table may identify a maximum issue age by a product and/or other factors. A product code table may identify one or more product codes by a product, an annuitant's age, a rider selection and/or other factors. A premium source code table may provide premium source code information. A products table may be used to identify one or more approved products. Other tables including various other data may be defined and implemented, in accordance with the present invention.

An appropriate set of transaction templates and other information may be stored on the user desktop 120 or another designated device. The user 110 may then disconnect at 176 from the server 140. The user 110 may then remotely engage in an interview process with a client 170. The client 170 may input interview data 178 as prompted by a customized set of transaction templates generated by the pre-interview process and/or other data. After the interview data 178 is received, the user 110 may reconnect at 180 to the Internet 130 via the user desktop 120 to transmit the interview data 178 to the server 140. The server 140 may then generate an appropriate package of forms 182 and/or other information to the user 110 based on data received during the interview process with the client 170 and/or other sources of data.

Figure 2:
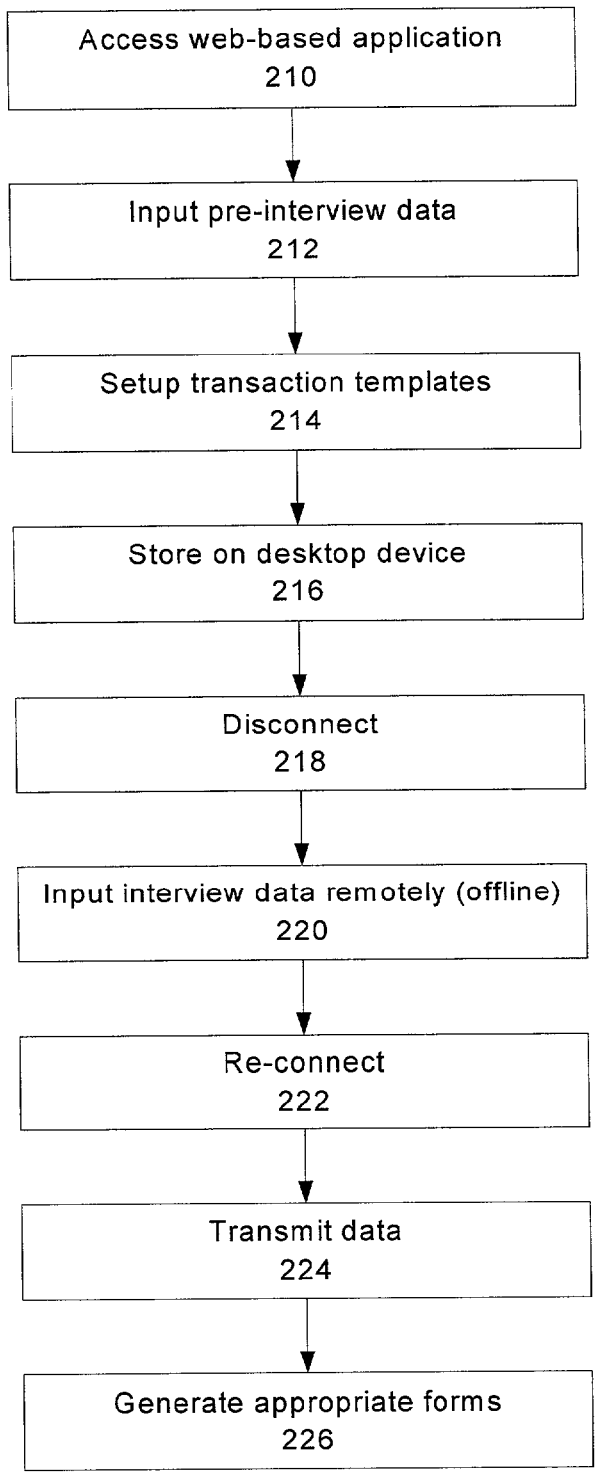
FIG. 2 is a flowchart illustrating steps performed in a method for generating electronic forms for purchasing financial products, according to an embodiment of the present invention.

FIG. 2 is a flowchart illustrating steps performed in a method for generating a set of electronic forms for purchasing one or more financial products, according to an embodiment of the present invention. At step 210, a user, sales agent or another representative may access a web-based application of the present invention. At step 212, the user may input pre-interview data. At step 214, a server of the present invention may generate a plurality of appropriate transaction templates based on the pre-interview data, various factors, rules tables and other data. At step 216, the generated transaction templates and other data may be stored on a desktop device associated with the user. At step 218, the user may disconnect from the web-based application. At step 220, the user may remotely input interview data from a client. At step 222, the user may reconnect with the web-based application. At step 224, data remotely collected during the interview process with the client may be transmitted to the server of the present invention. At step 226, the server may generate an appropriate set of forms based on the interview data obtained from the client. The steps shown in FIG. 2 will now be explained in further detail. While the present invention will be applied to forms for purchase of variable annuities for illustrative purposes, the present invention is not limited to this application and may be applied to other financial and other products.

Figure 3:
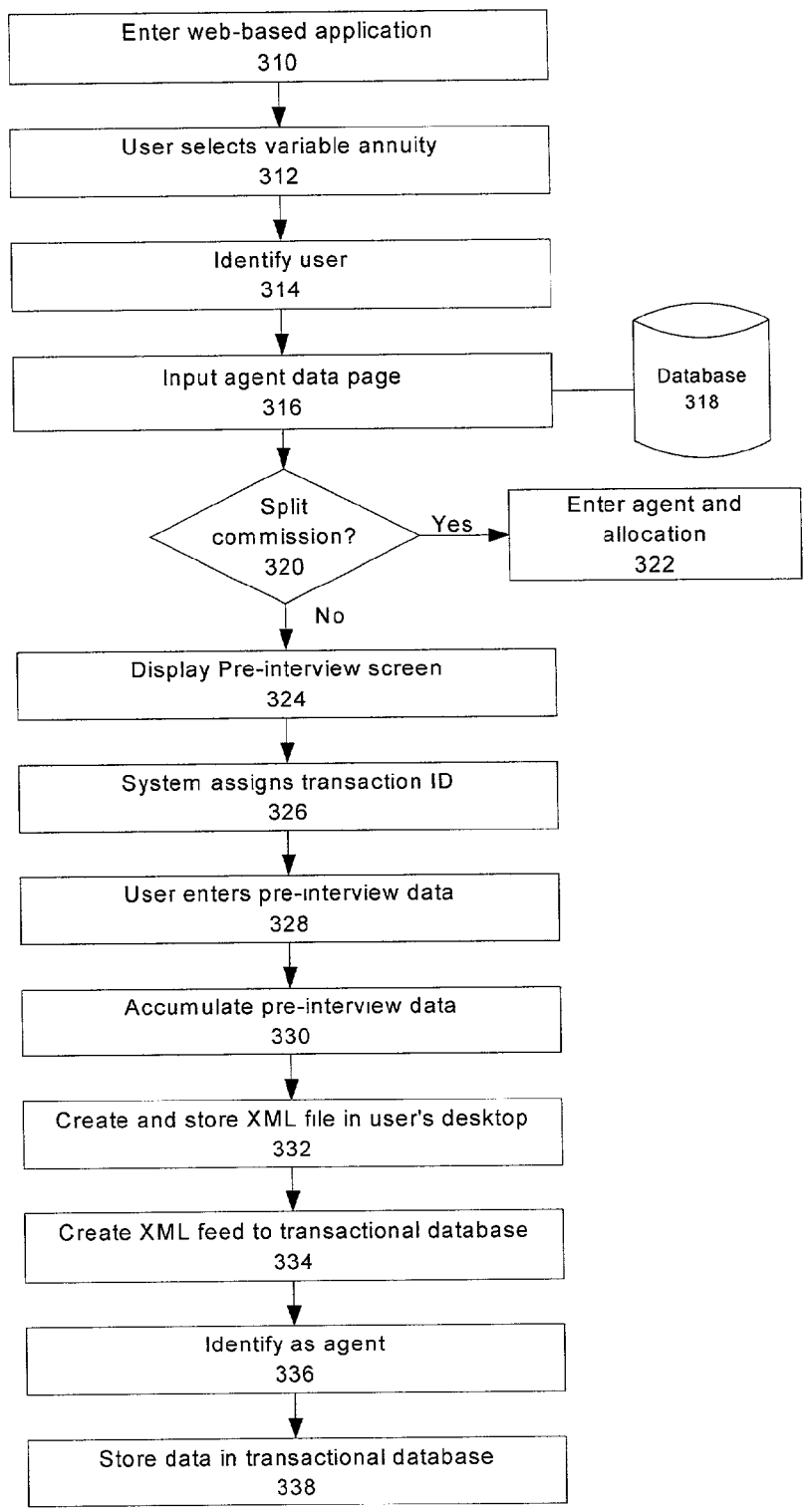
FIG. 3 is a flowchart illustrating steps performed in a method for accessing a web-based application for inputting pre-interview data, according to an embodiment of the present invention.

FIG. 3 is a flowchart illustrating steps performed in a method for accessing a web-based application for inputting pre-interview data, according to an embodiment of the present invention. At step 310, a user may access a web-based application of the present invention. A user (e.g., a sales agent) may be authenticated by entering a personal identifier and/or a password. At step 312, the user may select a product for sale, such as a financial product. For example, choices from a product line may include a variable annuity, a long term care product, a fixed annuity and other products. One or more restrictions may be applied to the user's choice of product based on availability. In addition, the user may be allowed to access links for an associated legal entity in which the user has been previously licensed and currently holds an active license status.

At step 314, the user may be identified. For example, the user may be identified as an internal or an external agent, for example. The user may enter an identification code, such as a social security number, a writing code or another identifier. At step 316, the system may access an agent database at step 318 to input associated user data by using the identification code. An agent data page may display a writing code, an agent name, an agency name, an agency code, an agent address, a list of states in which the agent is currently appointed to sell one or more financial products, a list of effective dates, a list of expiration dates and other agent data.

At step 320, the user may split a sales commission with other agents or other entities. The user may enter one or more agent names and/or identifiers and an amount of the sales commission to be split, which may be expressed as a percentage, at step 322. At step 324, a pre-interview screen may be displayed to prompt pre-interview data input. The pre-interview data may include data related to a state, a state of delivery, a product, a plan, a funding means, an expected premium, an annuitant's date of birth and/or other data. At step 326, the system of the present invention may assign a transaction identifier. At step 328, the user may enter the appropriate pre-interview as prompted by the pre-interview display.

For example, the user (e.g., the sales agent) may enter the state of transaction or the state the application was signed. The state the transaction (e.g., application, contract, etc.) will be delivered may also be entered. The user may select from a list of product choices. Products with firm approval and product availability may be displayed which may be based upon certain factors, such as the state of transaction or the state in which the application was signed. A list of approved products may then be displayed for selection. A plan type may be displayed for user selection. A list of funding types associated with the plan type may be displayed as well for user selection. The sales agent or other user may enter annuitant related data, such as an annuitant's date of birth. The system of the present invention may then calculate the age of the annuitant and validate the calculated age against an age restriction table, for example. If the age of the annuitant is not validated, a warning message may be displayed. The system may prompt the user to enter a new annuitant, a new product, another entry or re-enter the annuitant's age. If the age of annuitant is validated, the user may enter an expected premium.

An amount entered for the expected premium may be validated against a minimum/maximum table. For example, if the amount is above a maximum amount, a warning or another message may be displayed. If the amount entered does not meet minimum requirements outlined in a prospectus or otherwise determined, the user may be prompted to add a premium or select another product. Other options may also be available.

At step 330, the pre-interview data may be accumulated. At step 332, an XML file may be created and stored in a specific directory on a desktop device associated with the user. Other files may be created, in accordance with the present invention. At this point, the user (e.g., the sales agent) may be prepared to use the application of the present invention and may work offline. At step 334, an XML feed to one or more transactional databases may be created. At step 336, the user may be identified as a sales agent or other type of user. At step 338, data collected may be stored in one or more transactional databases.

Figure 4:
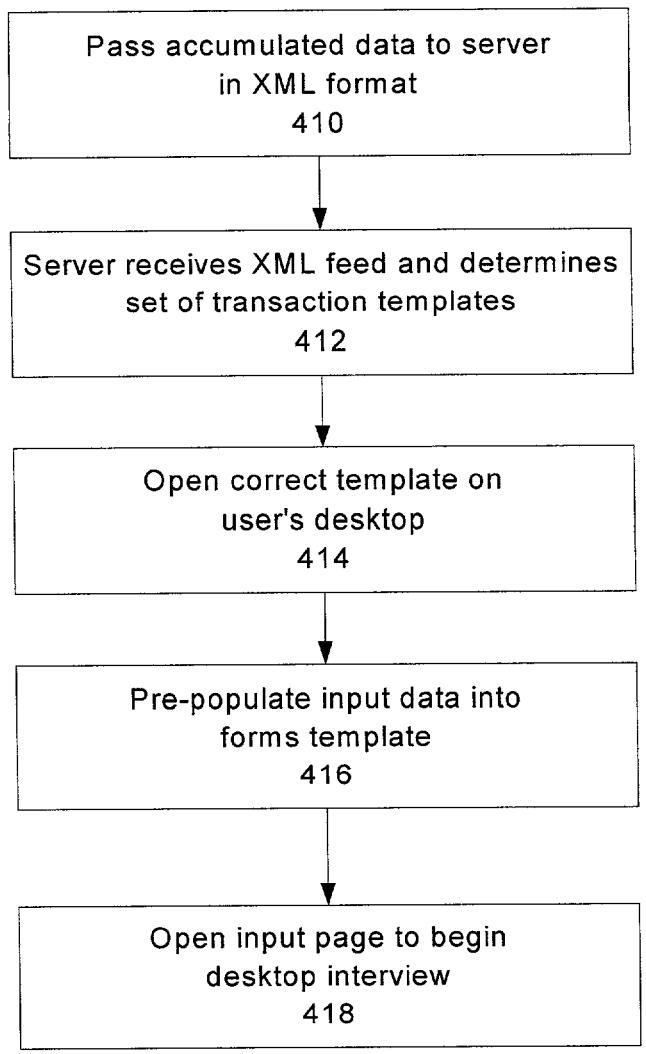
FIG. 4 is a flowchart illustrating steps performed in a method for initiating a desktop interview, according to an embodiment of the present invention.

FIG. 4 is a flowchart of a method for initiating a desktop interview, according to an embodiment of the present invention. At step 410, accumulated data may be passed to a server in an XML format feed. Other formats may be implemented. At step 412, the server may receive the XML feed and determine an appropriate set of transaction templates. At step 414, the sales agent or other user may open the appropriate set of transaction templates on a desktop device. At step 416, the templates may be displayed pre-populated by input data obtained from the pre-interview process and/or other sources of data. At step 418, the user (e.g., the sales agent) may input the initial page and remotely initiate a desktop interview with a client.

Figure 5:
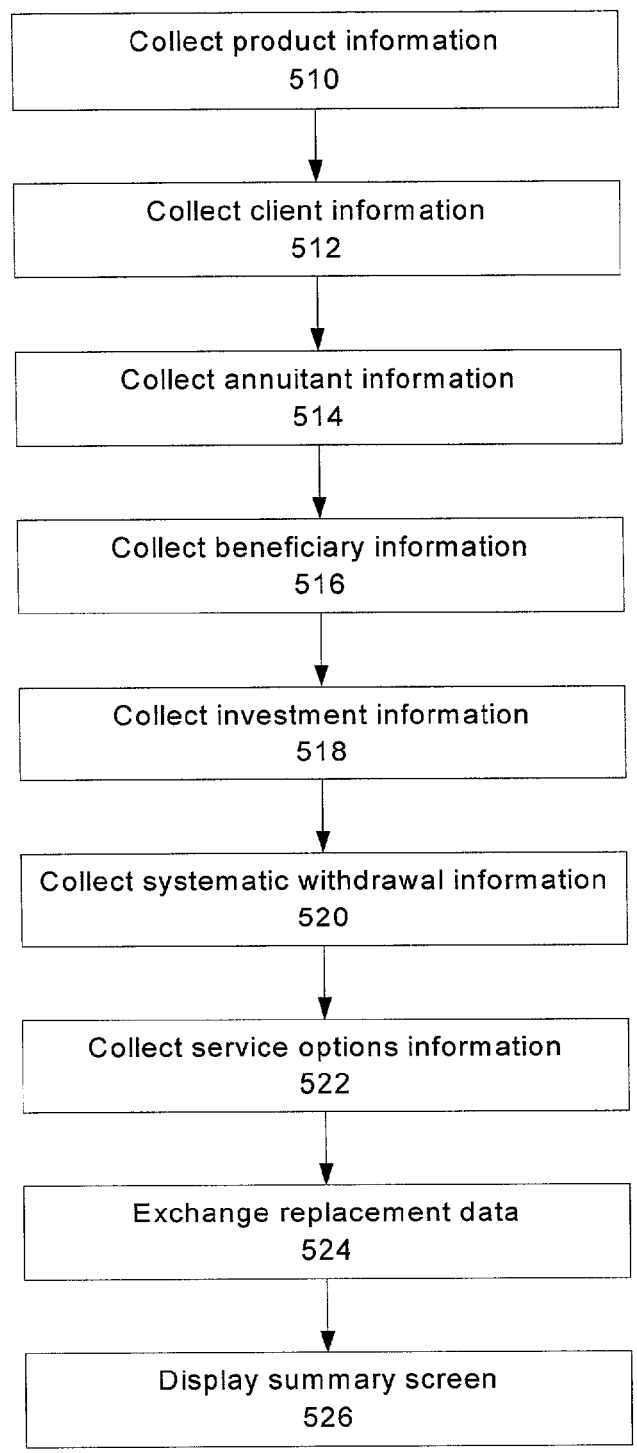
FIG. 5 is a flowchart illustrating steps performed in a method for participating in a desktop interview, according to an embodiment of the present invention.

FIG. 5 is a flowchart of a method for participating in a desktop interview, according to an embodiment of the present invention. During the desktop interview, various types of information may be collected by the user (e.g., agent) from a client. At step 510, additional product information may be collected. At step 512, client information may be collected. At step 514, annuitant information may be collected. At step 516, beneficiary information may be collected. At step 518, investment information may be collected. At step 520, systematic withdrawal information may be collected. At step 522, one or more service options information may be collected. At step 524, replacement data may be exchanged. At step 526, a summary screen may be displayed. The steps of FIG. 5 will now be described in further detail below.

Figure 6:
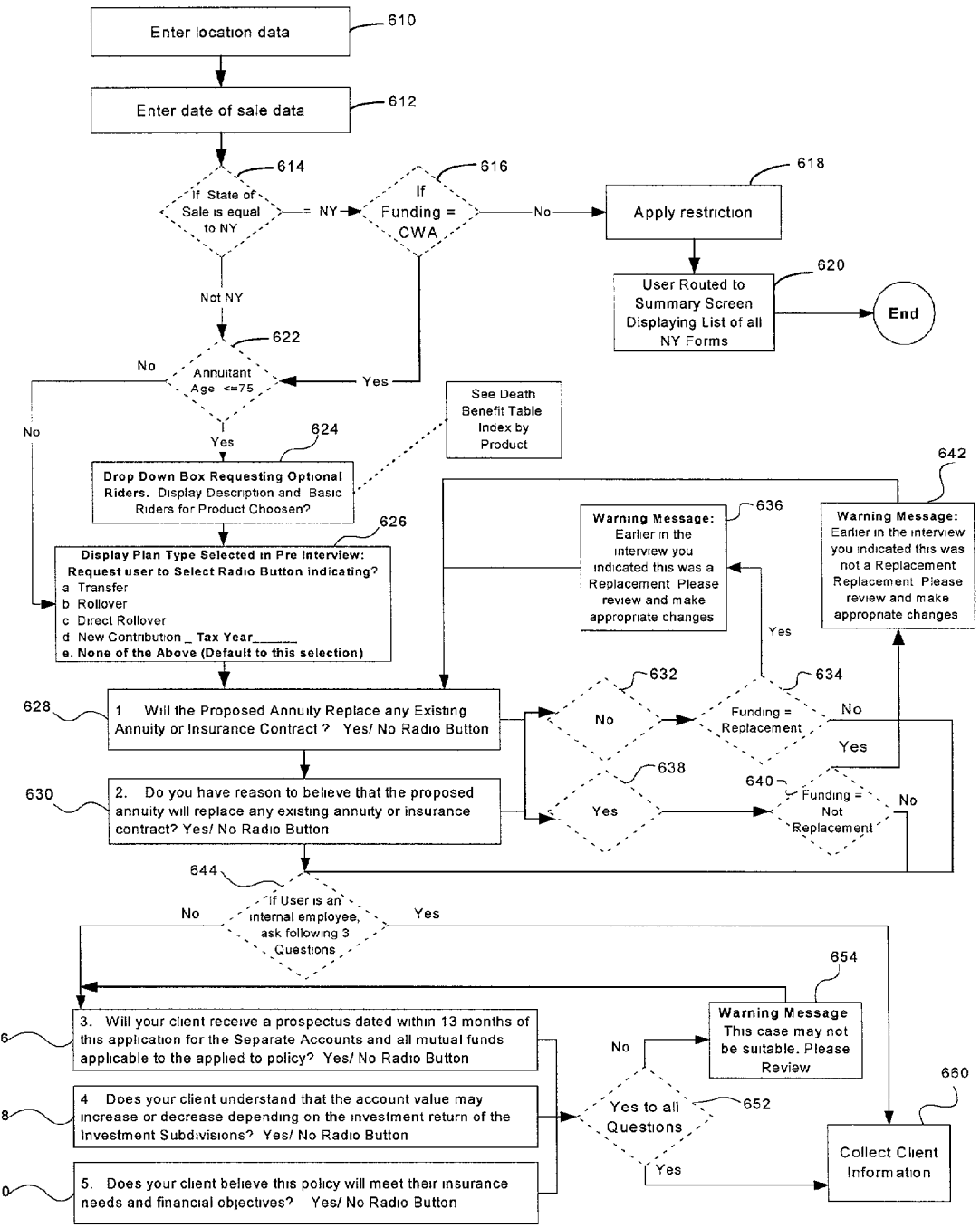
FIG. 6 is a flowchart illustrating steps performed in a method for collecting product information, according to an embodiment of the present invention.

FIG. 6 is a flowchart showing a plurality of steps performed in a method for collecting product information, according to an embodiment of the present invention. This flowchart may be used to trigger additional forms and further define a specific transaction of interest to the client. At step 610, a user may enter specific location data, such as a city in which a sale of a financial product will take place. At step 612, the user may input date of sale data, such as a date on which an application for sale of the financial product will be signed. A default date of sale may be the current day. Various restrictions may be verified based on state data. For example, at 614, it may be determined whether the state of sale is a specific state, such as New York where certain restrictions may apply. For example, if funding is not CWA (cash with application), a restriction may be applied at 618. CWA may involve a process in which an agent (broker or other entity) completes a paper transaction, faxes information to a new business (or other) office and provides an application with an original signature and funds via mail or other mechanism. At step 620, the user may be routed to a summary screen where a list of a particular state's (e.g., NY) forms may be displayed. Other alternatives may be provided to the user.

Other restrictions may include age restrictions. For example, it may be determined whether the annuitant's age is equal to or less than 75 years, at step 622. If so, optional rider information may be entered where a description and one or more basic riders for a product chosen may be displayed, at step 624. Some products allow for optional riders to be selected that give clients and other users more features on the account. A death benefit table may be accessed for validation. If the annuitant's age is not subject to the restriction at 622, the user may select one or more plan type options based on the plan type selected during the pre-interview process. The plan type options may include a transfer, a rollover, a direct rollover, a new contribution, and none of the above. Other plan type options may also be implemented.

A series of questions may be prompted to the client which may be used to ensure that the client is fully aware of various consequences in connection with selection of a particular financial product and available options. For example, steps 628 and 630 may be used to verify a replacement of existing annuities or insurance contracts. These steps may be implemented to educate the client. If the client does not intend to replace existing annuities or insurance contracts, the system may provide one or more warnings messages and an ability to make one or more appropriate changes, as shown by steps 632, 634 and 636 as well as steps 638, 640 and 642.

At step 644, it may be determined whether the user is an internal employee for whom rule validation may provide warnings for errors while still allowing the internal employee to proceed with the transaction. If so, the user may begin collecting client information at step 660. If not, additional questions may be prompted to the client to verify the client's willingness to purchase a particular product, as illustrated by steps 646, 648 and 650. The user may then begin collecting client information at 660.

Figure 7:
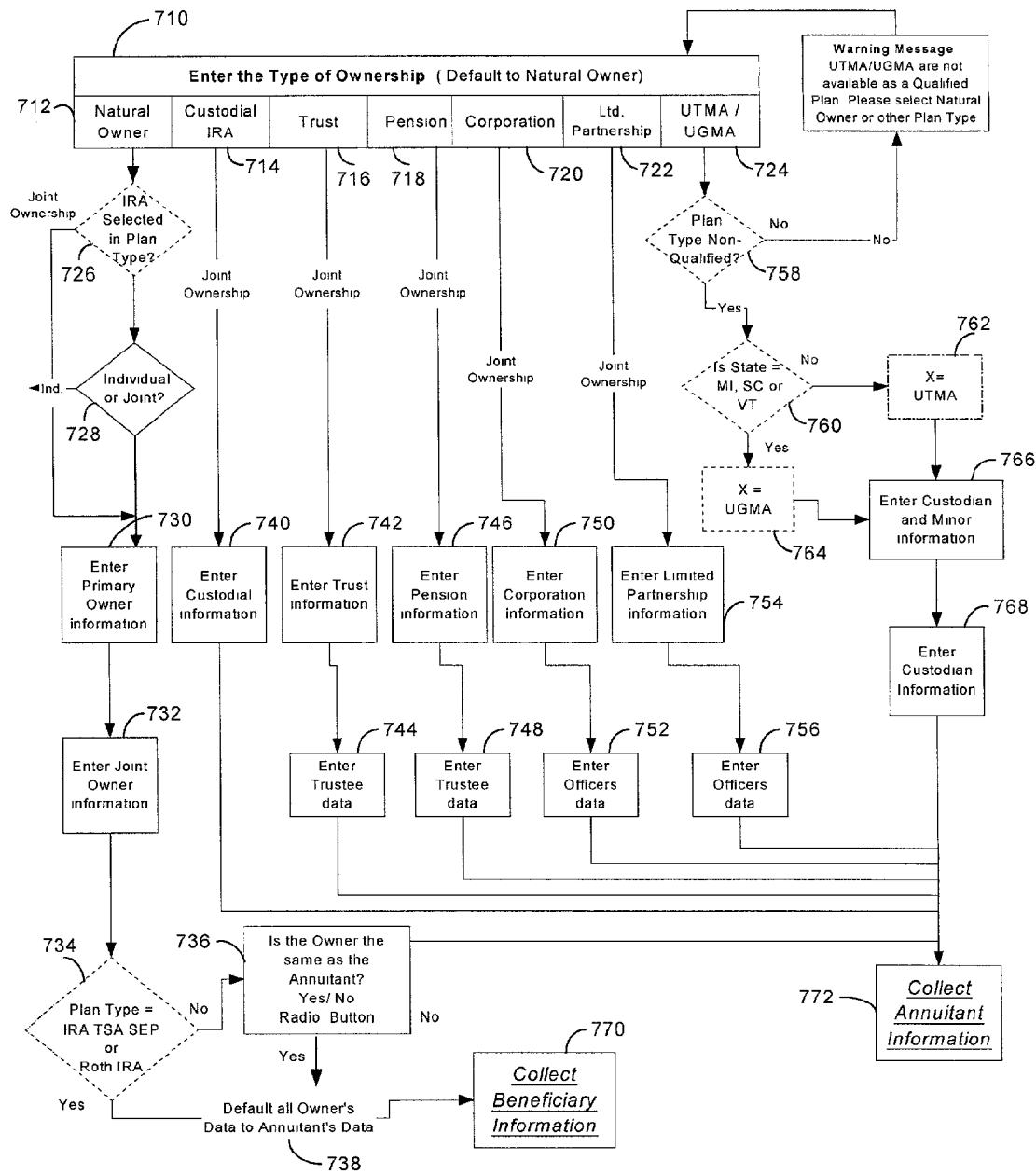
FIG. 7 is a flowchart illustrating steps performed in a method for collecting client information, according to an embodiment of the present invention.

FIG. 7 is a flowchart illustrating steps performed in a method for collecting client information, according to an embodiment of the present invention. This flowchart may be used to determine ownership information. At step 710, a user may identify a type of ownership, where a default type of ownership may be to a natural owner. The user may select a natural owner at step 712, a custodial IRA at step 714, a trust at step 716, a pension at step 718, a corporation at step 720, a limited partnership at step 722, or a qualified owner of a Uniform Trust for Minors Act (UTMA) or Uniform Gift to Minors Act (UGMA) type of investment at step 724. Other types of owners may be identified.

If a natural owner is selected, it may be determined whether an IRA is selected in the plan type, at step 726. The plan type may represent a sub account of the policy and provide a more specific format for completing the transaction. At step 728, it may be determined whether ownership is by an individual or joint owners. If joint owners are identified, then the user may enter primary owner information at step 730 and joint ownership information at step 732. Primary owner information may include a combination of a name, a gender, a date of birth, a social security number, a telephone number, a street address, a city, a state, a zip code and other information. Joint owner information may include a combination of a name, a gender, a date of birth, a social security number, a telephone number, a street address, a city, a state, a zip code and other information. At step 734, it may determined whether the plan type is of a specific type (e.g., individual retirement account (IRA) tax sheltered annuity (TSA) simple employee pension (SEP) or Roth IRA). If so, the owner's data may be defaulted to the annuitant's data, at step 738. Beneficiary information may then be collected at step 770. If not, it may be determined whether the owner is the same as the annuitant. If so, the owner's data may be defaulted to the annuitant's data, at step 738. If not, annuitant information may be collected at step 772.

If a custodial IRA is selected at step 714, custodial information may be entered at step 740. The custodial information may include a combination of a name, a tax identification number, a street address, a city, a state, a zip code and other information. Annuitant information may be collected at step 772.

If a trust is selected at step 716, trust information may be entered at step 742. The trust information may include a combination of a name of trust, a date of trust, a trust identification number, a street address, a city, a state, a zip code and other information. At step 744, one or more trustees may be identified. Annuitant information may be collected at step 772.

If a pension is selected at step 718, pension information may be entered at step 746. The pension information may include a combination of a name of pension, a date of trust, a tax identification for pension, a street address, a city, a state, a zip code and other information. At step 748, one or more trustees may be identified. Annuitant information may be collected at step 772.

If a corporation is selected at step 720, corporation information may be entered at step 750. Corporation information may include a combination of a legal entity name of corporation, a tax identification number for the corporation, a street address, a city, a state, a zip code and other similar information. At step 752, one or more officers and/or authorized signors may be identified. Annuitant information may be collected at step 772.

If a limited partnership is selected at step 722, limited partnership information may be entered at step 754. The limited partnership information may include a combination of a name of limited partnership, a tax identification number for the limited partnership, a street address, a city, a state, a zip code and other information. At step 756, one or more officers and/or authorized signors may be identified. A copy of the limited partnership charter and a list of partners may be included in an application package. Annuitant information may be collected at step 772.

If a UTMA/UGMA is selected at step 724, it may be determined whether a plan type is nonqualified, at step 758. If not, a warning message may be displayed at step 756 which may indicate that the UTMA/UGMA is not available as a qualified plan. Whether the UTMA or UGMA is available to a client may depend on state restrictions. For example, if a state associated with the client is Michigan, South Carolina or Vermont, as shown by step 760, a UGMA may be available, at step 764. If the client is associated with any other state, a UTMA may be available, at step 762. At step 766, a name of a custodian and a name of a minor may be entered. At step 768, custodian information may be entered, which may include a street address, a city, a state, a zip code and other information. Annuitant information may be collected at step 772.

Figure 8:
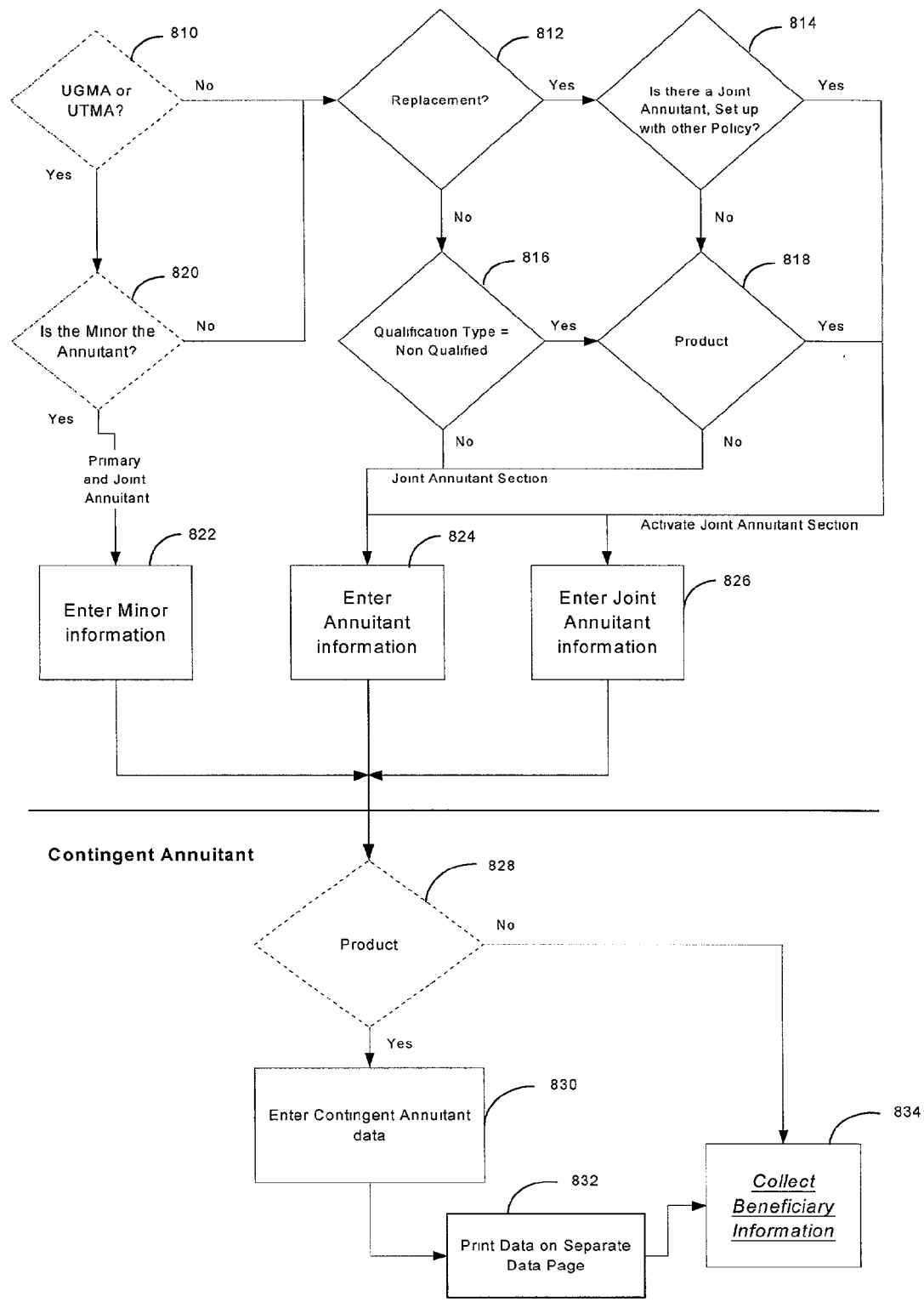
FIG. 8 is a flowchart illustrating steps performed in a method for collecting annuitant information, according to an embodiment of the present invention.

FIG. 8 is a flowchart illustrating a plurality of steps performed during a method for collecting annuitant information, according to an embodiment of the present invention. This method may be used to determine annuitant identity. The need for annuitant data may be based on the type of product selected by the client, the ownership and/or other factors. For example, a particular product may necessitate specific annuitant data. For example, at step 810, it may determined whether a specific product (e.g., a UGMA or a UTMA type of product) was selected by the client. If not, it may determined whether the product selected is a replacement, at step 812. If so, and if there are joint annuitants, a different policy may be established for the client that better suits the client's needs, at step 814. If the product is not a replacement, qualification type data may be determined at step 816. In this example, if the qualification type is non-qualified, it may be determined whether the product is a specific product, at step 818. If so, joint annuitant data may be entered at step 824 and at step 826. Annuitant data entered at step 824 may include a combination of a name, a gender, a date of birth, a social security number, a telephone number, an address, a city, a state, a zip code and other similar information. Some information, such as the date of birth, may be extracted from the pre-interview data and/or other sources of data. The joint annuitant data entered at step 826 may include a combination of a name, a gender, a date of birth, a social security number, a telephone number, an address, a city, a state, a zip code and other similar information.

If the product selected is not a replacement (step 812) nor a non-qualified type (step 816), a joint annuitant section may apply where annuitant data may be entered, at step 824.

If the product selected by the client is a UGMA or UTMA type of product (step 810), it may be determined whether the minor is the annuitant, at step 820. If not, it may be determined whether the product selected is a replacement, at step 812. If so, primary and joint annuitant section may apply where minor information may be entered at step 822. The minor information may include a combination of a date of birth, a social security number, an address, a city, a state, a zip code and other similar information.

Contingent annuitant data may be entered for certain products. For example, if the product selected is a specific product, such as Commonwealth Variable Annuity Plus (CVA plus), contingent annuitant data may be entered at step 830. The contingent annuitant data may include a combination of a name, a gender, a date of birth, a social security number, a telephone number, an address, a city, a state, a zip code and other similar information. At step 832, data may be printed separately, or other actions may be performed. Beneficiary information may then be collected at step 834.

Figure 9:
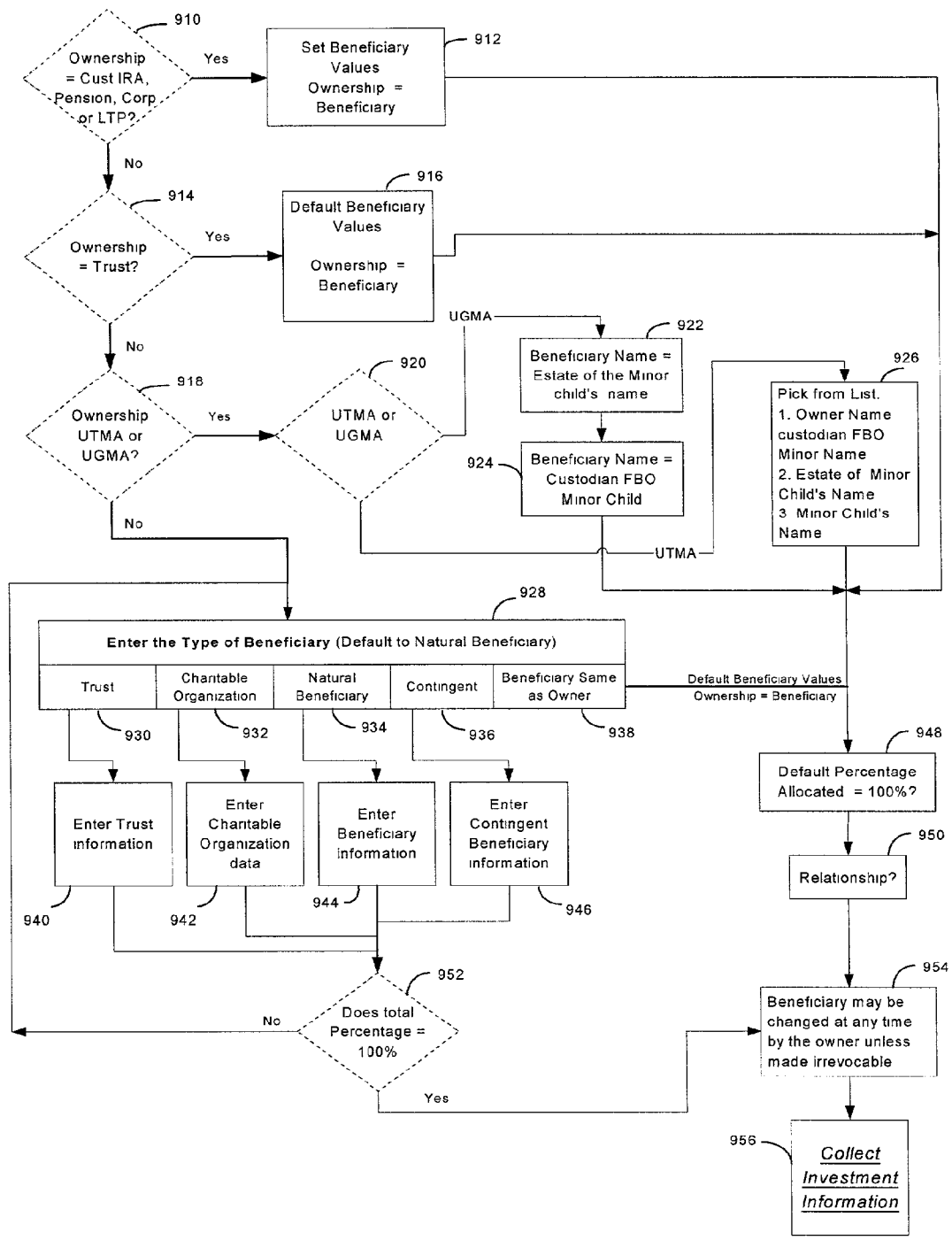
FIG. 9 is a flowchart illustrating steps performed in a method for collecting beneficiary information, according to an embodiment of the present invention.

FIG. 9 is a flowchart illustrating a plurality of steps performed in a method for collecting beneficiary information, according to an embodiment of the present invention. This method may be used to determine beneficiary identity. Beneficiary qualifications may vary depending on the type of ownership and other factors involved. If the ownership of a product is a custodian, a pension, a corporation or a limited partnership as determined by step 910, beneficiary information may be equal to the owner's information, at step 912. In addition, edits may not be allowed for these types of ownership. If the ownership of a product is a trust as determined by step 914, one or more default values may be set to equal beneficiary values. In addition, edits may be allowed, at step 916. If the product involves a UTMA or a UGMA type of investment as determined by step 918, different guidelines may be followed for each type of ownership. For example, if the product is a UGMA and if a minor is an annuitant as determined by step 920, then the beneficiary name may be set to the estate of the minor at 922. If the minor is not the annuitant, then the beneficiary name may be set to a custodian for the benefit of the minor child, at step 924. If the product is a UTMA type of investment, as determined by step 920, a user may select from the owner name a custodian for the benefit of a minor, an estate of the minor child, the minor, or another entity. The default percentage of ownership allocated may be set at 100%, at step 948. A relationship of the beneficiary to the owner may be determined at step 950.

If the product involved is not a custodial IRA, a pension, a corporation, a limited partnership, a trust, a UTMA or a UGMA, a beneficiary type may be selected at step 928. The beneficiary type may include a trust 930, a charitable organization 932, a natural beneficiary 934, a contingent beneficiary 936, a beneficiary who is the same as the owner 938 or other type of beneficiary. A default to a natural beneficiary may be applied.

If a trust is selected at step 930, trust information may be entered at step 940, which may include a combination of a percentage of ownership allocated, a name of a trust, a date of the trust, a name of a trustee, a trust identification number and other similar information. If a charitable organization is selected at step 932, charitable organization data may be entered at step 942, which may include a combination of percentage of ownership allocated, a name of a charitable organization, a contact name, a phone number, a title and other similar information. If a natural beneficiary is selected at step 934, beneficiary information may be entered at step 944, which may include a combination of a percentage of ownership allocated, a name, a date of birth, a relationship, a gender, an address, a telephone number, a city, a state, a zip code and other similar information. If a contingent beneficiary is selected at step 936, contingent beneficiary information may be entered at step 946, which may include a combination of a percentage of ownership allocated, a name, a date of birth, a relationship, a gender, an address, a telephone number, a city, a state, a zip code and other similar information. If a total percentage does not equal 100% as determined at step 952, the user may be given an option to select another beneficiary or change the percentages allocated to equal 100%. If the beneficiary is the same as the owner, as specified at step 938, one or more default beneficiary values may equate ownership data to beneficiary data. Beneficiary data may be changed at any time by the owner or a representative, unless made irrevocable by selecting an option, at step 954. Investment information may then be collected at step 956.

Figure 10:
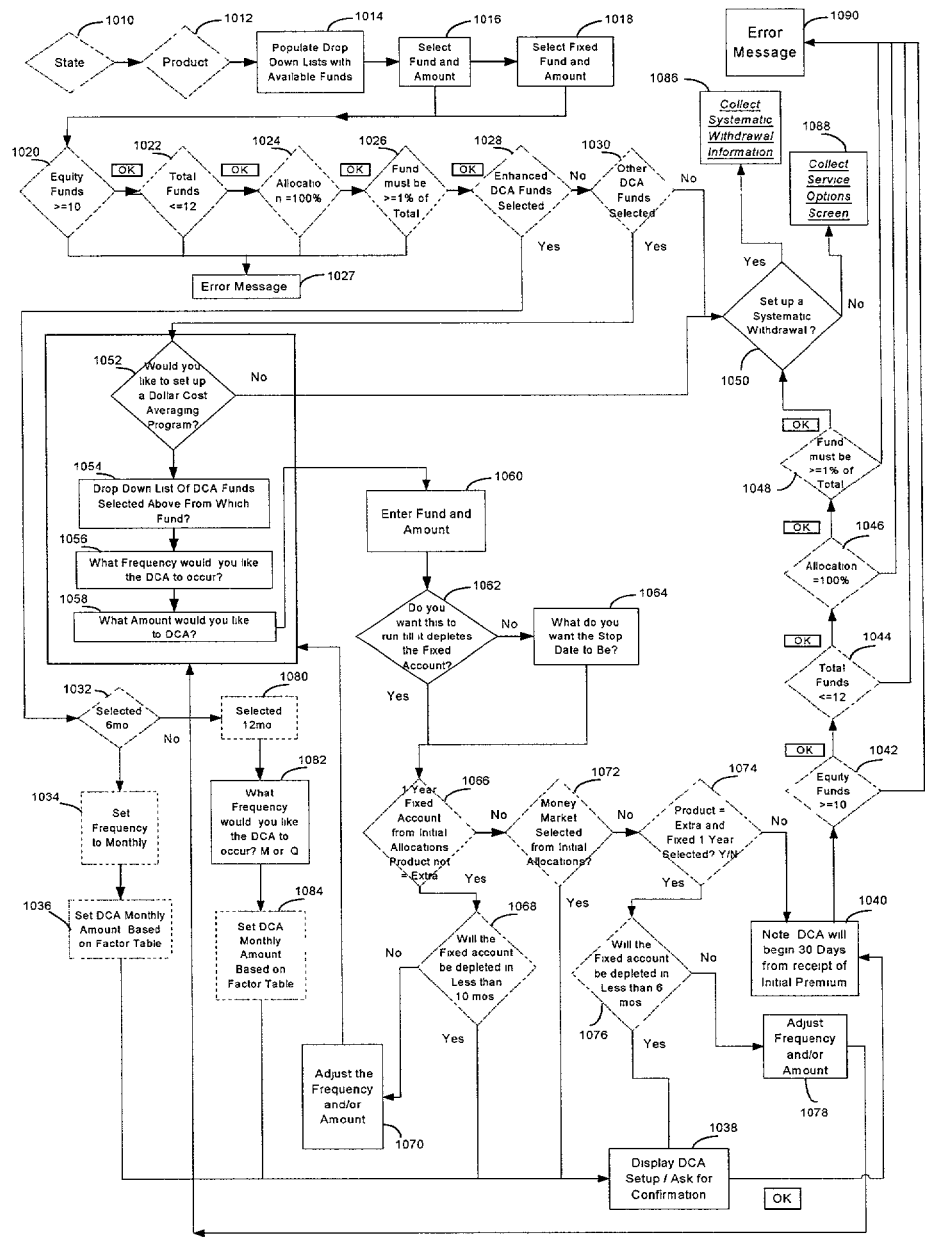
FIG. 10 is a flowchart illustrating steps performed in a method for collecting investment information, according to an embodiment of the present invention.

FIG. 10 is a flowchart illustrating a plurality of steps performed in a method for collecting investment information, according to an embodiment of the present invention. This method may be used to gather data related to a client's investment choices, such as fund identification, an ownership allocation amount (e.g., percentage), and other similar information. Information related to the applicable state at step 1010 and selected product at step 1012 may be retrieved and used to populate drop down lists with available funds. For example, an allocation table by product and by state may be used to determine the available funds, at step 1014. At step 1016, a user may select at least one fund and enter an appropriate investment amount (e.g., percentage, dollar amount, fraction, etc.). Different categories of funds available may be displayed to the user. For example, a predetermined number of fixed funds and allocation amount may be available for selection at step 1018.

Various qualifications may be determined for validation. For example, considerations may include whether equity funds are equal to or greater than 10 at step 1020; whether total funds are equal to or less than 12 at step 1022; whether the allocation amount is equal to 100% at step 1024; and whether funds must be equal to or greater than 1% of the total at step 1026. If a consideration is not satisfied, an error message may be displayed at step 1027.

In addition, other considerations may include whether enhanced DCA funds are selected at step 1028 and whether other DCA funds are selected at step 1030, for example. DCA funds allow for the option to systematically transfer on a monthly (or other) basis a set dollar amount from a Money Market Sub account and/or a Guarantee Account (or other account) to any combination of other accounts as long as a maximum number allowed under the contract is not exceeded. Enhanced DCA funds may include funds that pay bonus interest on purchase payments for the Guarantee accounts. If neither fund is selected, systematic withdrawal option may be presented at step 1050. Systematic withdrawal information may be collected at step 1086. Service options information may be collected at step 1088.

If enhanced DCA funds are selected at step 1028, a selected time period may be entered. For example, if the selected time period is 6 months at step 1032, frequency may be set to monthly, at step 1034. In addition, a DCA monthly amount may be set based on a factor table and/or other information, at step 1036. At step 1038, DCA information may be displayed for confirmation and accuracy.

The user may be informed that DCA will begin a predetermined number of days (e.g., 30 days) from receipt of an initial premium or another triggering event, at step 1040. Other considerations may be analyzed for validation purposes. For example, the considerations may include whether equity funds are equal to or greater than 10 at step 1042; whether total funds are equal to or less than 12 at step 1044; whether an ownership allocation equals 100% at step 1046; and whether funds are equal to or greater than 1% of the total allocation at step 1048. If these considerations are not satisfied, an error message may be displayed at step 1090. The user may then be given the option to set up a systematic withdrawal at step 1050. Systematic withdrawal information may be collected at step 1086. Service options information may be collected at step 1088.

If other DCA funds, which may include those funds that do not pay bonus interest, or other non-enhanced funds are selected at step 1030, a dollar cost averaging program may be provided at step 1052. If the client decides to engage in the program, a selection may be made from a drop down list of DCA funds selected above, at step 1054. At step 1056, the user may enter frequency data, such as monthly, quarterly, or other time interval. At step 1058, the user may enter amount data for each DCA. Minimum and/or maximum amount restrictions may be applied. One or more DCA funds and allocation amounts may be identified at step 1060.

Other specifics may be identified. For example, the user may specify whether the DCA is to run until it depletes an identified fixed account, at step 1062. If not, a stop date may be determined at step 1064. If a DCA is to run until an identified fixed account is depleted, it may be determined if a one year fixed account from initial allocations product is not equal to a specific parameter or value, at step 1066. It may be determined whether the fixed account is to be depleted in less than a predetermined time period (e.g., 10 months), at step 1068. If not, the user may be given the option to adjust the frequency, amount or other factor. Otherwise, DCA setup information may be displayed for confirmation at step 1038.

If it is determined that a 1 year fixed account from an initial allocations product is not equal to a specific parameter or value, it may be determined whether a money market account is selected from the initial allocations, at step 1072. If not, it may be determined whether the product is equal a parameter or value, at step 1074. It may be determined whether the fixed account will be depleted in less than a predetermined time period (e.g., 6 months), at step 1076. If not, the user may be given the option to adjust frequency, amount and/or other factors, at step 1078. For example, a minimum restriction may be applied where the DCA is greater than 6 months, or other time period. If the fixed account will deplete in less than a predetermined time period (e.g., 6 months), then DCA setup information may be displayed for confirmation at step 1038.

The user may then be notified that the DCA will begin a predetermined time period (e.g., 30 days) from receipt of an initial premium or other triggering event, at step 1040. Other considerations may be analyzed for validation purposes. For example, considerations may include whether equity funds are equal to or greater than 10 at step 1042; whether total funds are equal to or less than 12 at step 1044; whether allocation equals 100% at step 1046; and whether funds are equal to or greater than 1% of the total allocation at step 1048. The user may then be given the option to set up a systematic withdrawal at step 1050. Systematic withdrawal information may be collected at step 1086. Service options information may be collected at step 1088.

Figure 11:
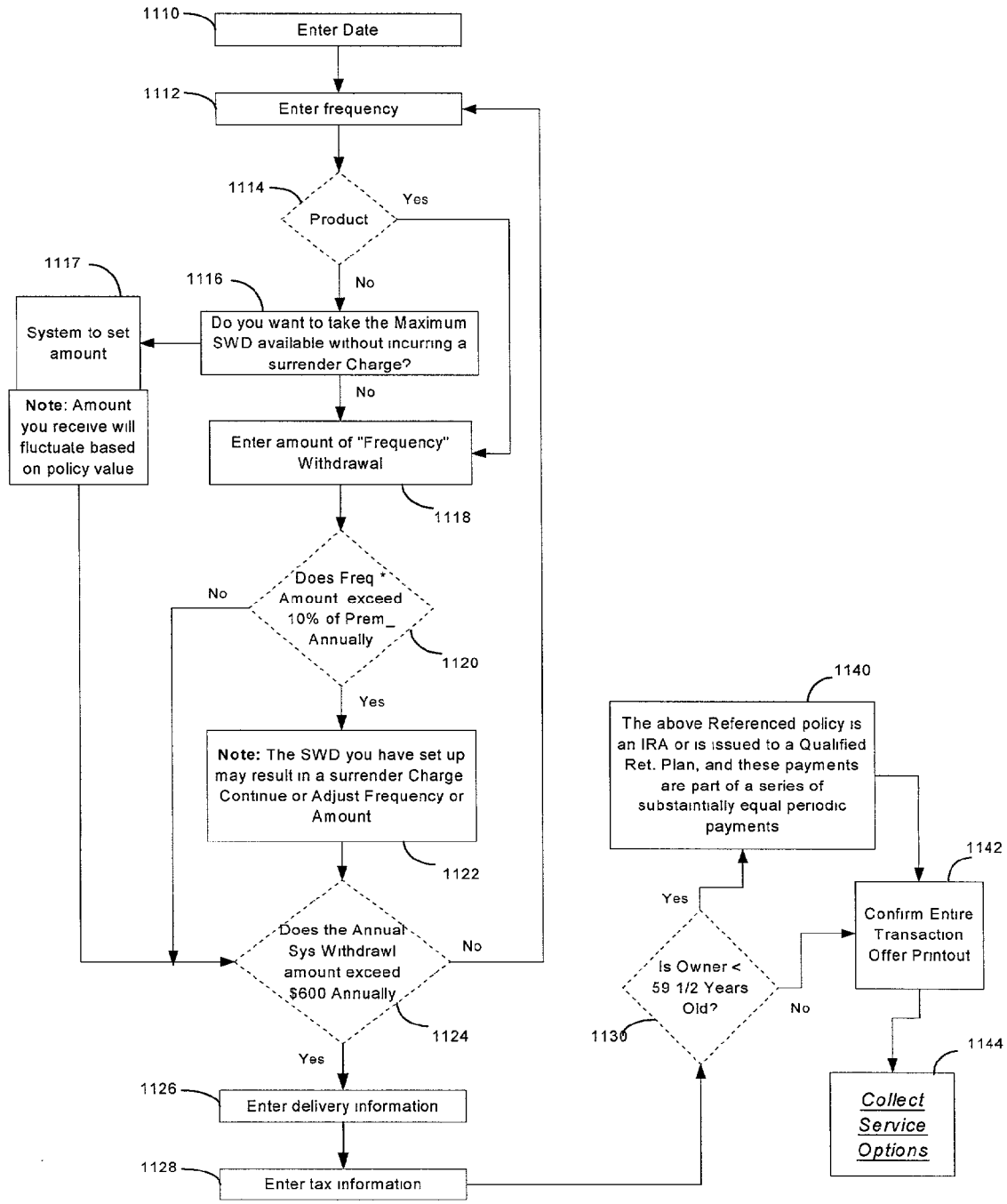
FIG. 11 is a flowchart illustrating steps performed in a method for collecting systematic withdrawal information, according to an embodiment of the present invention.

FIG. 11 is a flowchart illustrating a plurality of steps performed in a method for collecting systematic withdrawal information, according to an embodiment of the present invention. The user may initiate a series of withdrawals which may begin a predetermined time period (e.g., 30 days) after a policy date unless a date is specified. Other triggering events may be applied. The user may then be prompted to enter a start date, at step 1110. The user may then identify frequency of withdrawals, at step 1112. Withdrawals may occur monthly, quarterly, semiannually, annually or based on other defined time periods.

Certain products may have associated restrictions. For example, at step 1114, it may be determined whether the user's selection involves a particular product. If so, a frequency amount may be entered. Otherwise, the user may be given the option to take a maximum systematic withdrawal available without incurring a surrender or other charge, at step 1116. The system may then set an amount equal to a predetermined percentage (e.g., 10%) or amount to be withdrawn at a predetermined time period, such as annually, at step 1117. The user may also be notified that the amount received may fluctuate based on policy value and/or other factors. Frequency data may be entered at step 1118.

At step 1120, it may be determined whether the frequency amount exceeds a predetermined amount (e.g., 10%) of an annual premium amount. If so, the user may be notified that the systematic withdrawal selected by the user may results in a surrender charge, at step 1122. The user may be notified that the annual maximum is 10% (or other amount) and provide the user the ability to continue or adjust frequency, amount or other factor. At step 1124, it may be determined whether the annual systematic withdrawal amount exceeds a predetermined amount annually, which may be set to $600. If not, the user may be notified that the amount selected may be adjusted to exceed the predetermined amount annually (e.g., $600). The user may adjust the amount, frequency or other data, at step 1112.

At step 1126, delivery information may be obtained from the user. For example, the user may select a delivery method. Delivery options may include mailing the check to the owner's address, mailing the check to another address, and depositing the check directly into one or more identified accounts. If another address is requested, the user may enter address data which may include a combination of street address, city, state, zip code and other information. If direct deposit is requested, the user may enter financial information, which may include a combination of name of financial institution, address, type of account, account number, bank routing number, institution contact and other information. Other delivery options may be provided.

At step 1128, tax information may be obtained from the user. For example, withholding data may be specified. A plurality of withholding options may include backup withholding, no backup withholding, and withholding a percent as Federal Income Taxes. Other withholding options may also be specified. For example, if backup withholding is selected, a predetermined amount (e.g., 31%) may be withheld from distributions as Federal Income Taxes. In another example, a percentage to be withheld as Federal Income Taxes may be specified by the user.

At step 1130, one or more age limitations may be determined. For example, if the owner is less than 59½ years old, the user may be notified that the above reference policy is an IRA or is issued to a qualified retirement plan and these payments may be part of a series of substantially equal periodic payments, at step 1140. If the owner is not subject to the age limitation, the system may confirm the entire transaction and provide a printout to the user, at step 1142. The user may also be notified that the program may terminate automatically if the account value goes below a product minimum. Other restrictions may apply as well. Service options may then be collected at step 1144.

Figure 12:
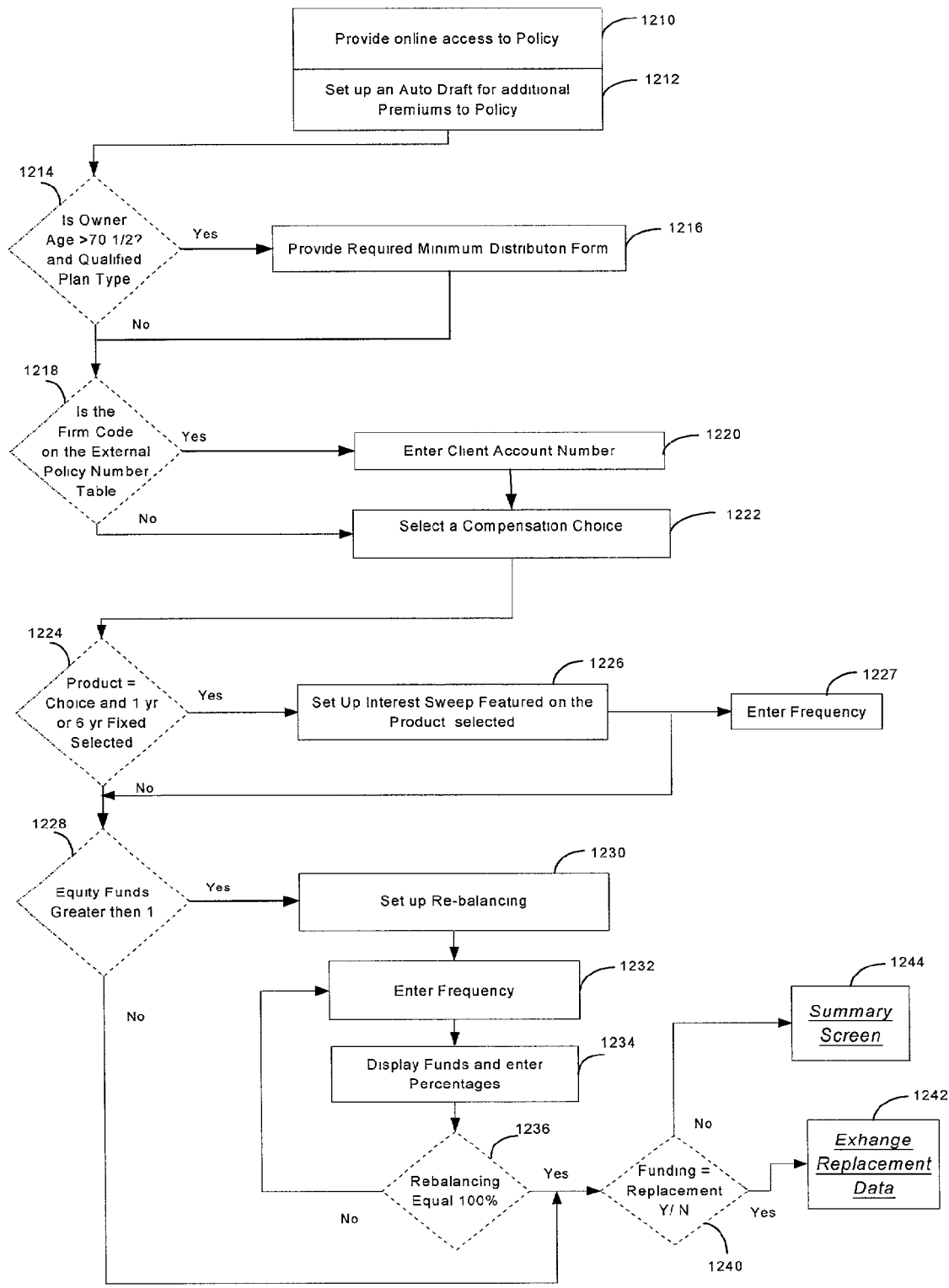
FIG. 12 is a flowchart illustrating steps performed in a method for collecting service option information, according to an embodiment of the present invention.

FIG. 12 is a flowchart illustrating a plurality of steps performed in a method for collecting service option information, according to an embodiment of the present invention. At step 1210, the user may enable the client to access the policy online. For example, the client may be assigned a PIN number. At step 1212, the client may setup an auto draft for additional premiums to the policy. Other options may be available.

Certain restrictions may apply to various service options. For example, an age restriction may be applicable. At step 1214, it may be determined whether the owner is greater than 70½ years old and has selected a qualified plan type. If so, a requirement minimum distribution form may be needed by a predetermined date, such as the end of the calendar year. The system may provide this form to the client, at step 1216. The system may automatically process this form.

An external policy number table may be accessed to determine whether certain data is required or not. For example, if the age restriction does not apply, it may be determined whether the firm code is included in an external policy number table at step 1218. For example, external policy numbers may include predetermined or assigned policy numbers used by an outside firm for ease of reference and tracking. Some firms may require a client account number. A client account number may be entered at step 1220. A compensation choice may be identified from an available list of choices, at step 1222. A compensation table may be accessed to verify an appropriate list of available choices based on various factors, such as firm and/or product, for example.

At step 1224, restrictions based on a particular product may be applied. For example, if the product includes a fixed term of years (e.g., 1 year or 6 years), the user may be given the option to set up an interest sweep featured on the product selected by the client, at step 1226. For guaranteed accounts (e.g., 1 year or 6 year) before the annuity commencement date, an entity may be instructed to transfer interest earned to one or more sub accounts for allocation of purchase payments. These instructions may be set at the time the account is established and may occur at specified timeframes, such as, quarterly, semi-annually, annually or other periods. A frequency data may be determined at step 1227.

At step 1228, other restrictions may entail determining whether equity funds are greater than 1, for example. The user may be given the option to set up re-balancing, at step 1230. If re-balancing is requested, frequency data may be entered at step 1232. Funds may be displayed and percentages may be entered at step 1234. If re-balancing is equal to 100%, at step 1236, it may be determined whether the funding qualifies as a replacement, at step 1240. Replacement data may be exchanged at step 1242. Otherwise, a summary screen may be displayed at step 1244.

Figure 13:
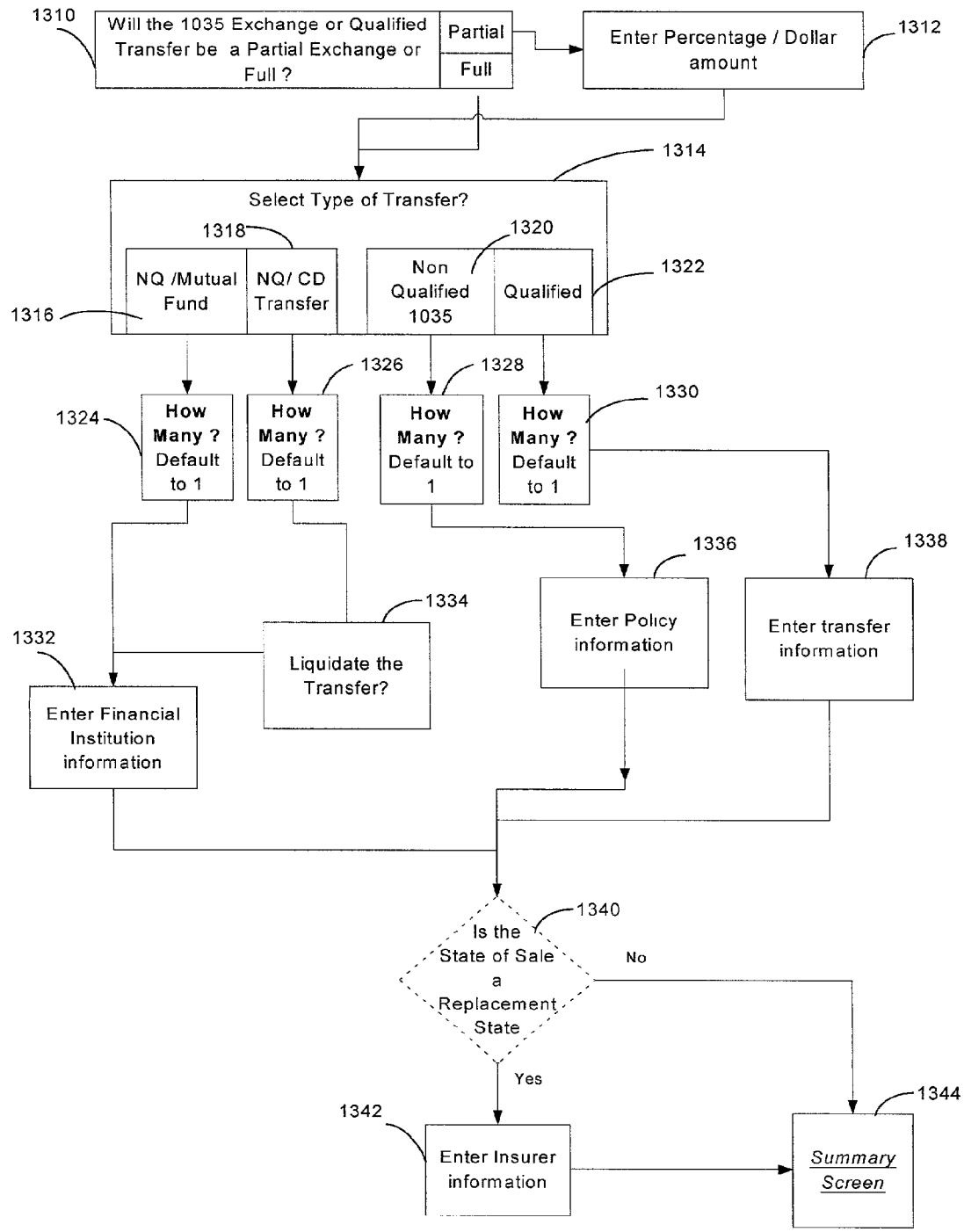
FIG. 13 is a flowchart illustrating steps performed in a method for collecting exchange/replacement information, according to an embodiment of the present invention.

FIG. 13 is a flowchart illustrating a plurality of steps performed in a method for collecting exchange/replacement information, according to an embodiment of the present invention. A user may select a full or partial exchange at step 1310. If the exchange is partial, the user may enter an amount (e.g., percentage, dollar amount, etc.) for an exchange transfer, at step 1312. The user may select type of transfer, at step 1314. Types of transfer may include a NQ/Mutual fund 1316, a NQ/CD transfer 1318, a non-qualified (e.g. non-qualified 1035) 1320, a qualified 1322 and other types of transfers. Transfers generally involve movements of money from one type of account to another. For example, a transfer may be qualified (e.g., no tax penalty for the movement) or non qualified (e.g., additional taxes may apply). The types of transfers displayed may be based on the plan type selected by the user. In addition, multiple choices of the same type of transfer may be selected. The user may then enter the number of transfers, at steps 1324, 1326, 1328, and 1330, respectively.

For a NQ/Mutual fund transfer, financial institution information may be entered at step 1332. Financial institution information may include a combination of a name, a street address, a street, a city, a zip code, a phone number, an account/certificate number, account/certificate owner's name, additional names (if more than one owner), an owner's social security number, additional social security numbers, and other information. For mutual fund liquidations, a signature guarantee may be required. Therefore, a copy of a recent statement may be included if available.

For a NQ/CD transfer, the user may be given the option of liquidating the transfer based on a triggering event, such as upon receipt or upon an upcoming maturity date, at step 1334. A maturity date may be specified at this step. Financial institution information may be entered at step 1332.

For a non qualified plan 1035, policy information may be entered, at step 1336. For example, policy information may include a combination of an existing policy or contract number, a name of insured (e.g., annuitant), a name of owner, a name of insurance company, a street address, a city, a state, a zip code and other similar information. In addition, the client may attach an old policy or may indicate that the old policy was lost.

For a qualified transfer, information related to this type of transfer may be entered at step 1338. Such information may include a combination of a current trustee/custodian, a custodian's mailing address, a custodian's phone number, an authorization to release information, an owner's name, an owner's address, a city, a state, a zip code, a phone number (e.g., home and/or business), a social security number, a tax identification number, an account number, an amount to be transferred (e.g., entire balance, select amount) and other similar information. In addition, the client may attach an old policy or may indicate that the old policy was lost.

At step 1340, a state of sale may be determined to be a replacement state. A replacement state table may be accessed for validation. Insurer information may be entered at step 1342. For example, insurer information may include a combination of an insurer as appears on the policy, an insured as appears on the policy, a policy number, a type of policy life annuity, a face amount and other similar information. At step 1344, a summary screen may be displayed to the user.

Figure 14:
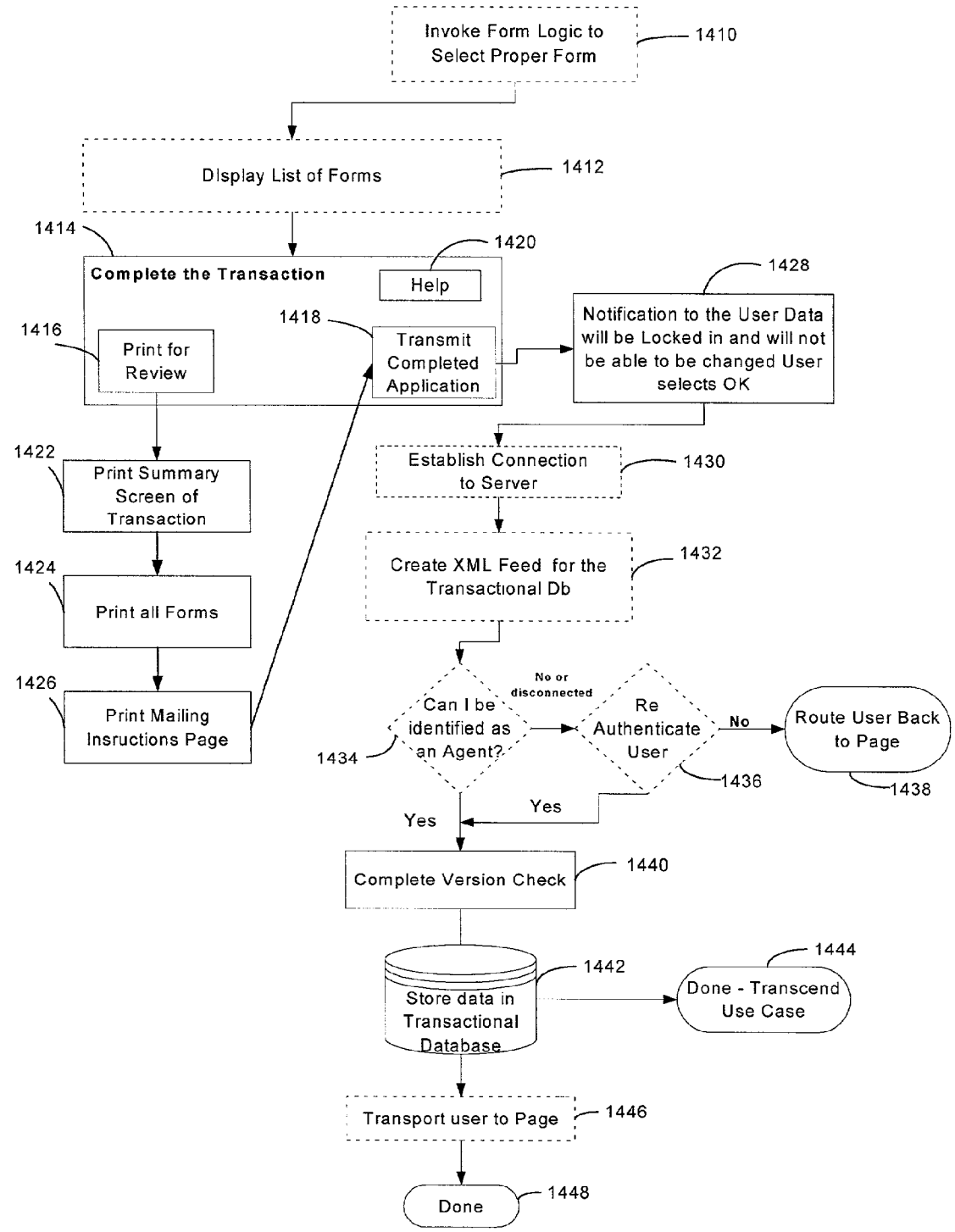
FIG. 14 is a flowchart illustrating steps performed in a method for displaying summary information, according to an embodiment of the present invention.

FIG. 14 is a flowchart illustrating a plurality of steps performed in a method for displaying summary information, according to an embodiment of the present invention. The summary display may be used to display a summary of the transaction, a lists of forms triggered, and/or other informational data. At step 1410, a form logic may be used to select a set of proper forms. At step 1412, a list of forms triggered may be displayed. In addition, one or more hyperlinks to one or more actual completed forms may be provided thereby enabling the user to click on any of the triggered forms to access that form to complete, revise and perform other operations. Each form may also include an indicator providing the status of each form, such as completed, needs additional information and other status data.

At step 1414, the transaction may be completed. Further, print options may be available. Print options may include print for review 1416, which may further include print summary screen of transaction 1422, print some or all forms 1424, print mailing instructions page 1426 and other print options. Help option 1420 may provide instructions on completion, frequency asked questions, annuity definitions, production information and other informative data.

At 1418, the completed application may be transmitted. A notification may be displayed to indicate to the user that user data may be locked in and may not be able to be changed, at 1428. At step 1430, a connection may be established to a server. At step 1432, an XML feed may be created for the transactional database. Other types of feed may be implemented as well. At step 1434, agent identification may be determined. If the agent is not identified or is disconnected, the user may be re-authenticated at step 1436. If not, the user may be routed to an appropriate page, at step 1438. A version check may be performed at step 1440. This step may ensure that updated versions of forms and other documents are implemented. Data may then be stored in transaction database 1442. The user may complete the program at step 1444 or be transported to a desired page, at step 1446, thereby completing the program at step 1448.

Figure 15:
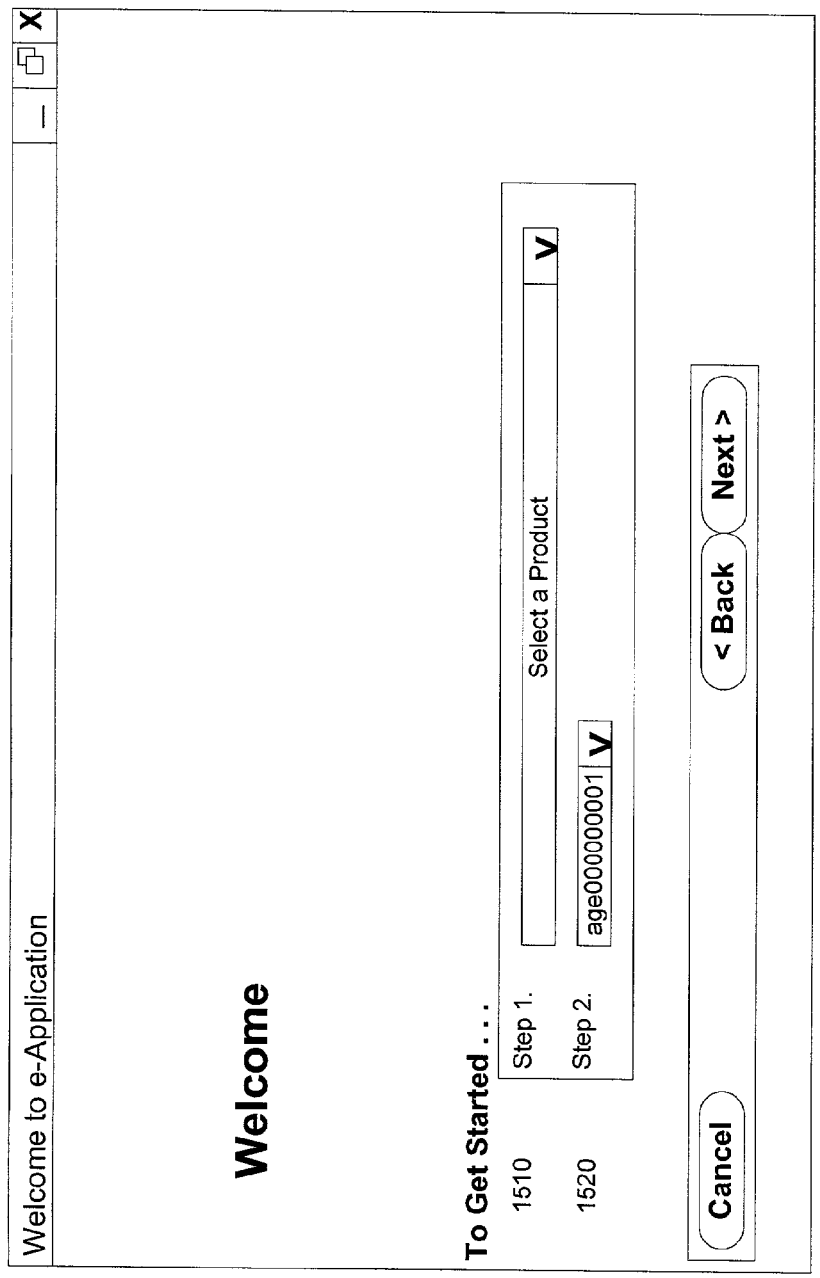
FIG. 15 is an example of a screen shot for a web-based application for gathering pre-interview data, according to an embodiment of the present invention.
Figure 24:
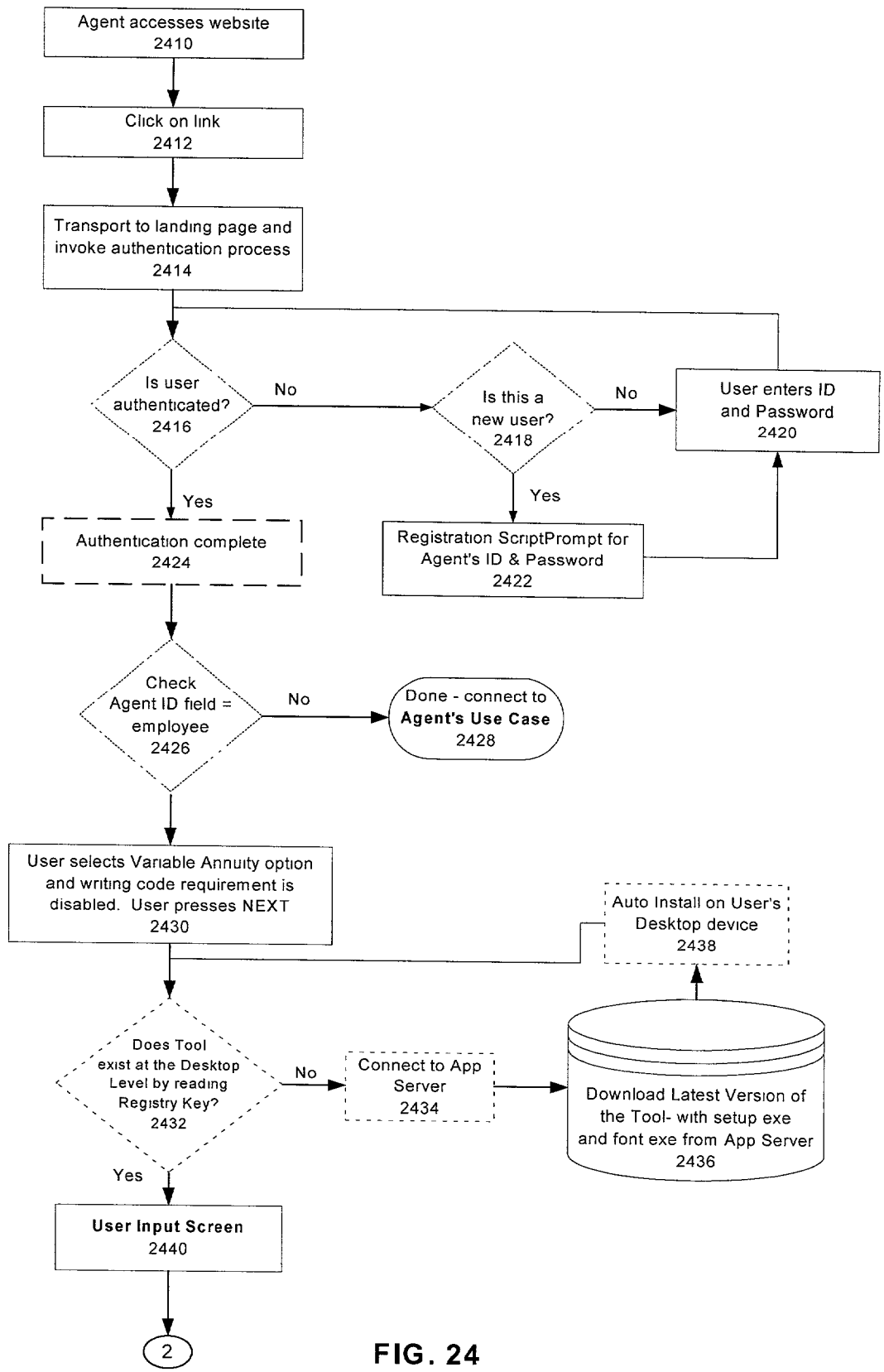
FIGS. 24-30 are flowcharts illustrating details of steps performed in a method for accessing a web-based application for inputting pre-interview data, according to an embodiment of the present invention.
Figure 25:
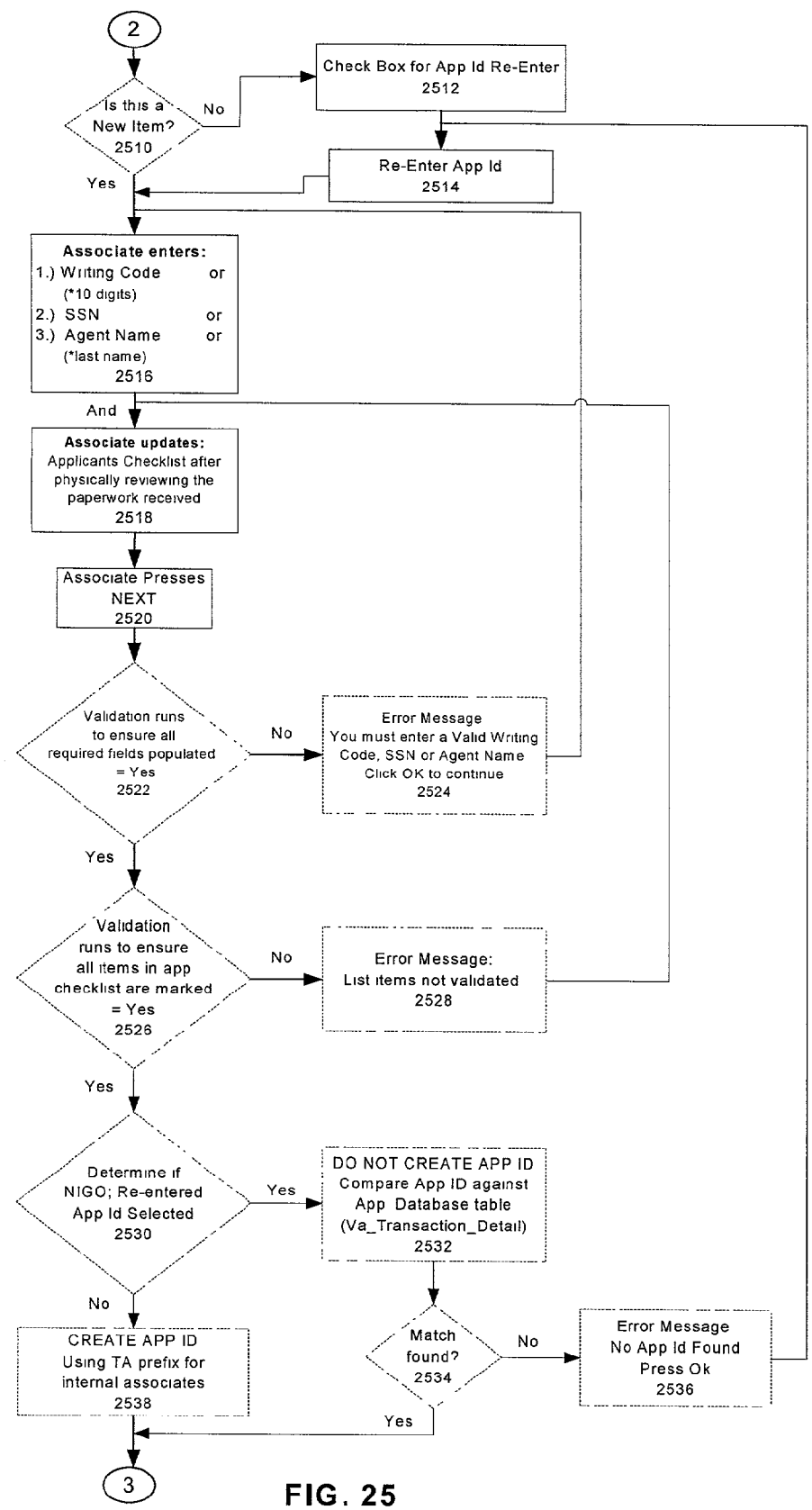
Figure 26:
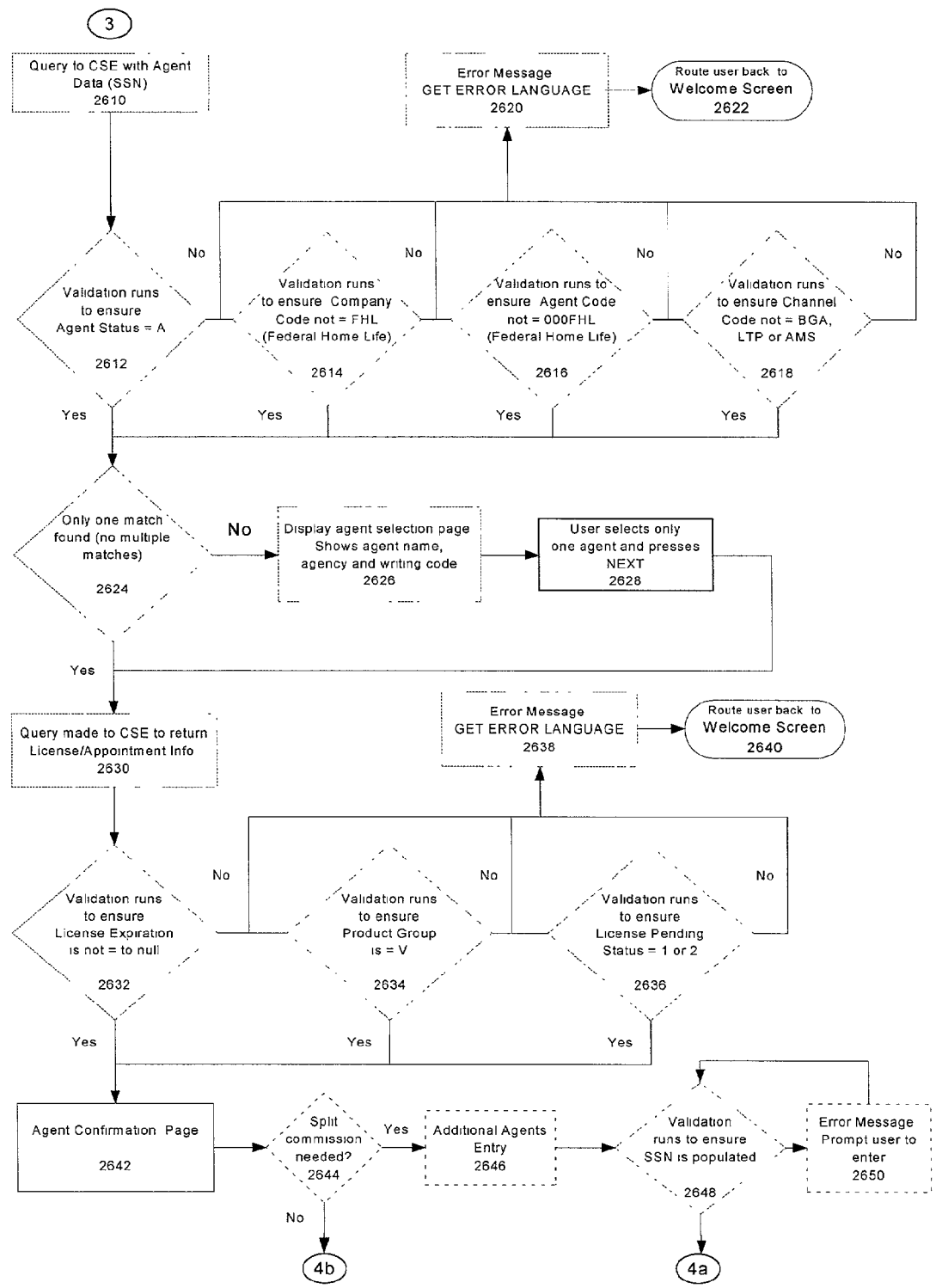
Figure 27:
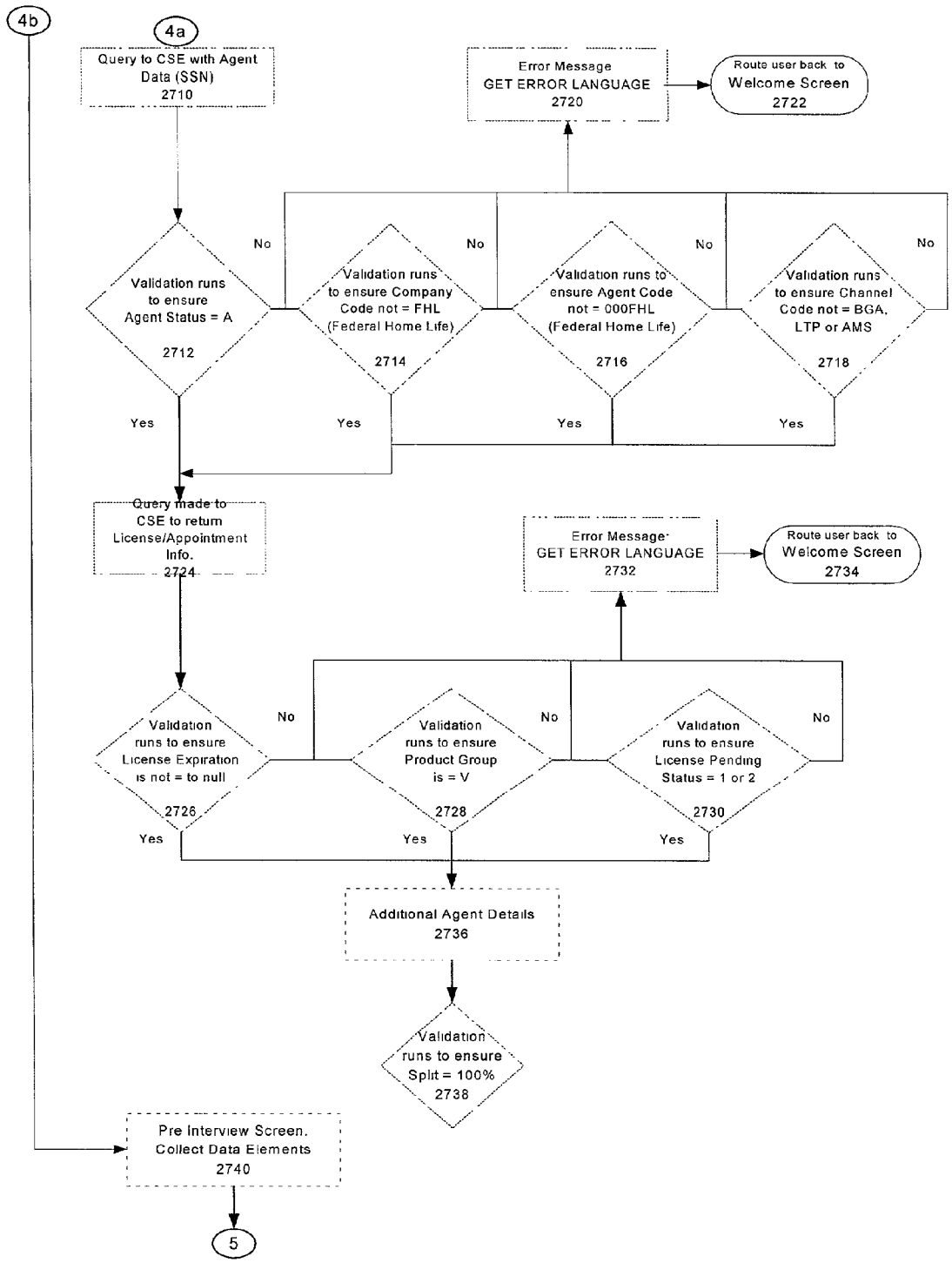
Figure 28:
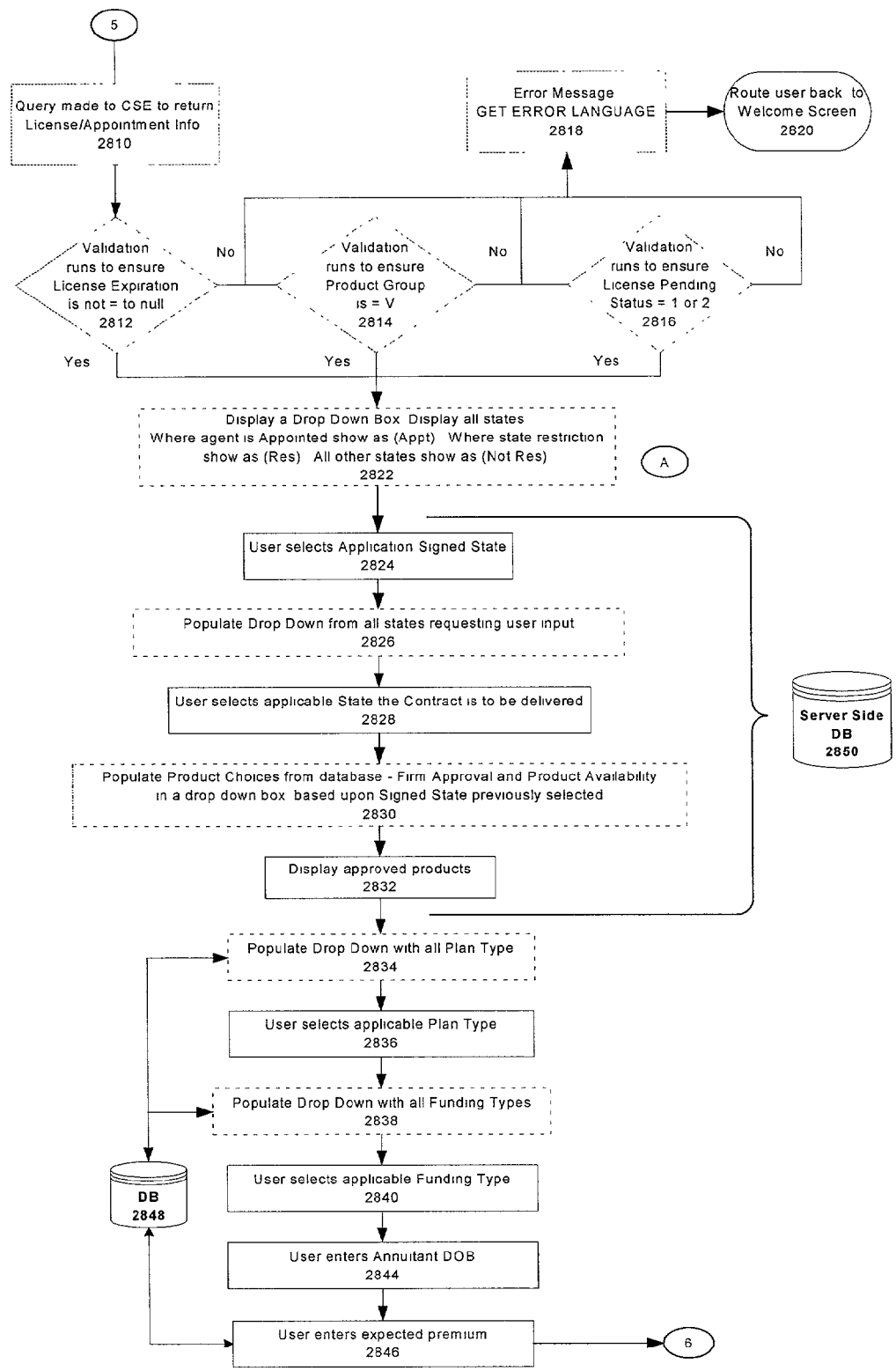
Figure 29:
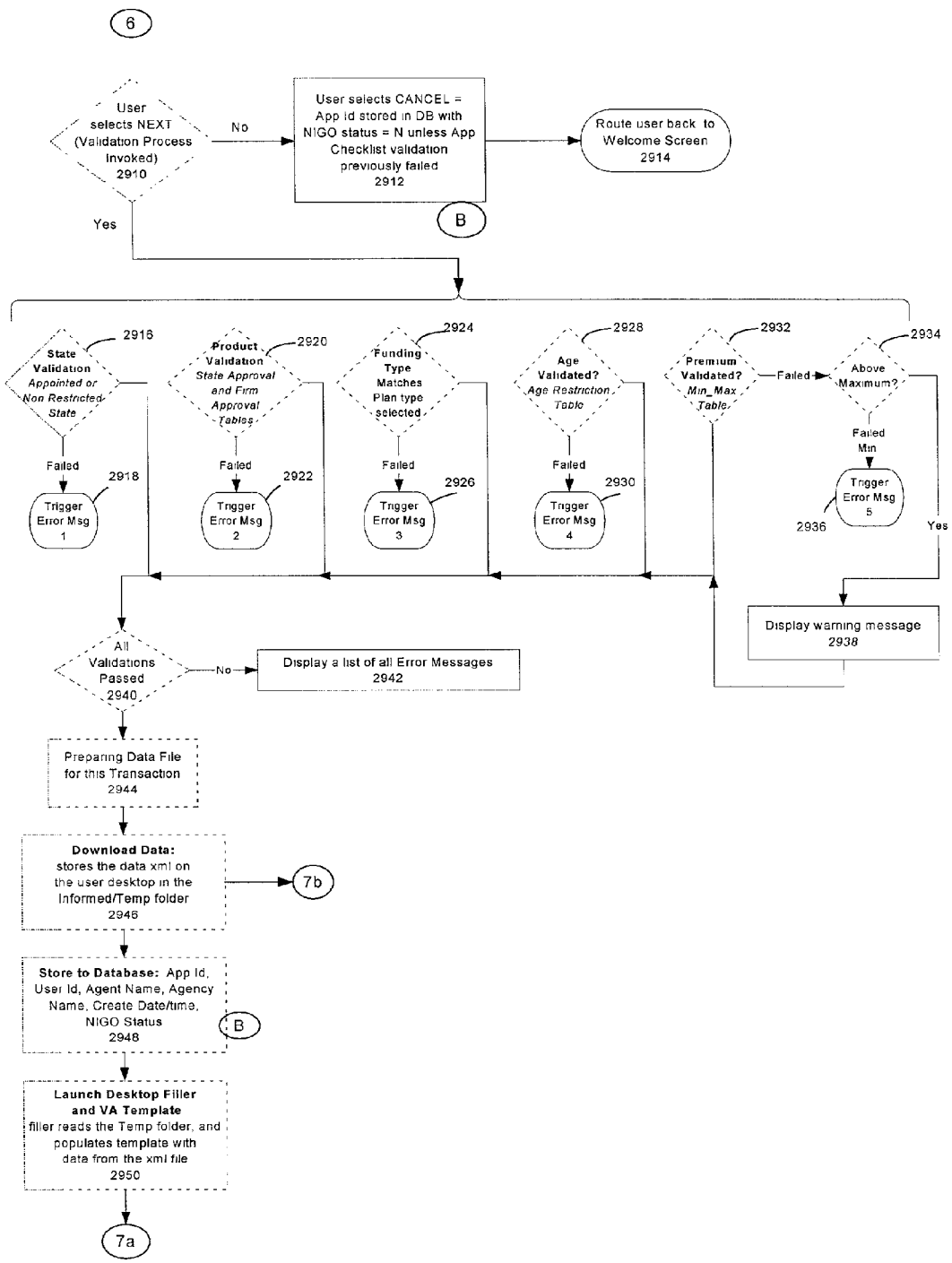
Figure 30:
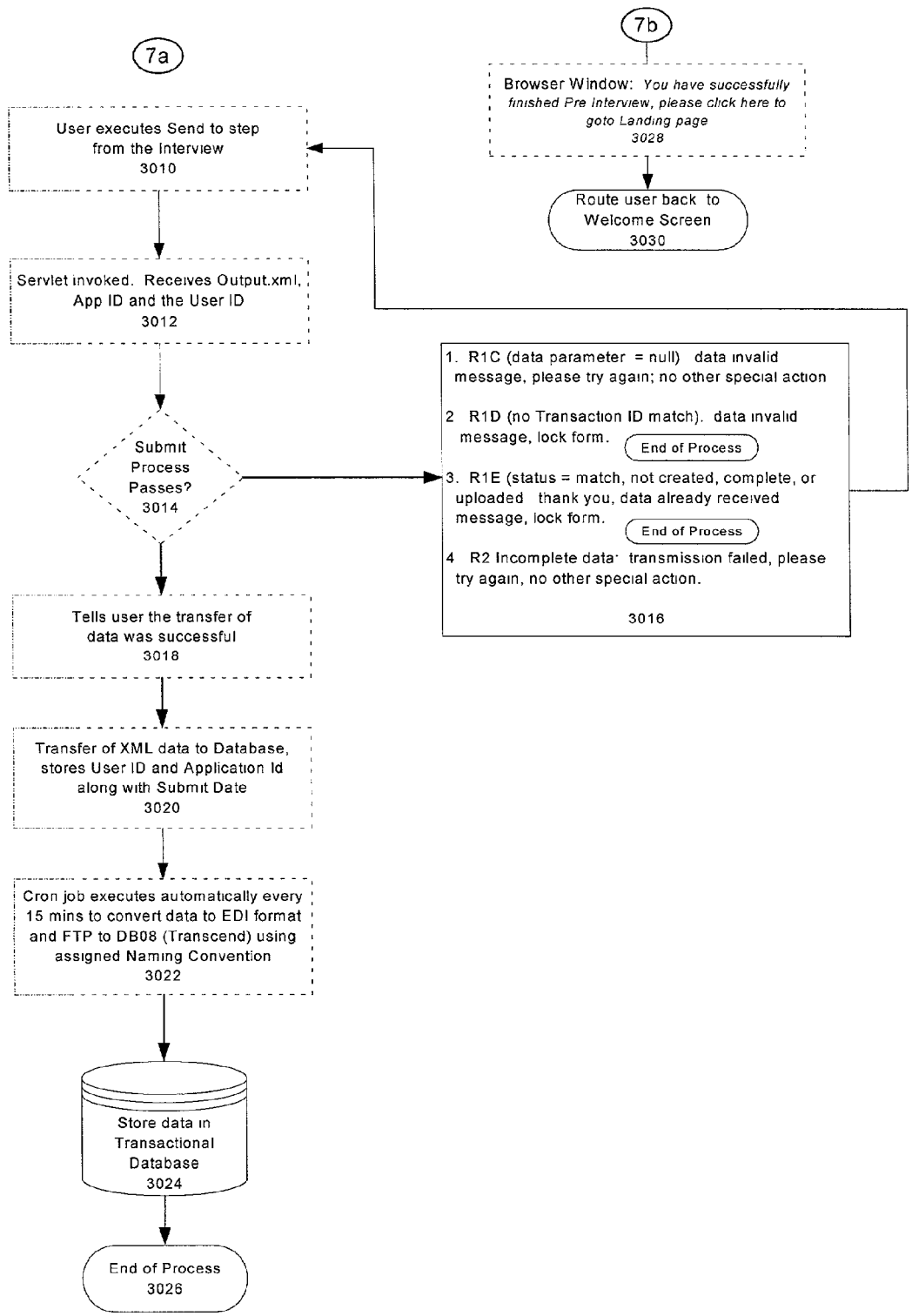

FIG. 15 is an example of a screen shot for a web-based application for gathering pre-interview data, according to an embodiment of the present invention. The application of the present invention provides a tool for guiding a user (e.g., an agent) through product features and requirements, state restrictions, tax considerations and/or other various factors. The application of the present invention completes an appropriate set of forms based on the answers provided and packages the forms for presentation to a client. Forms data may then be submitted electronically for more efficient processing. To initiate the present invention, a user may select a product, which may include financial products, such as variable annuities, at 1510. The user may then enter an identifier, such as an agent or writing code, at 1520.

FIG. 16 is an example of a screen shot for a web-based application for gathering pre-interview data, according to an embodiment of the present invention. This screen may display agent information entered by the user for confirmation. For example, agent data may be displayed as shown by 1610, where agent data may include an agency name, an agent name, an address, a writing code and/or other similar information. If a writing code is not available, a user may enter other identification information, such as a social security number/tax identification number, a last name, a first name and/or other similar information. Other identification information may include a state 1620, validation information 1622 and 1624. The user may also specify whether commission is to be split, by selecting an appropriate box at 1630.

FIG. 17 is an example of a screen shot for a web-based application for gathering pre-interview data, according to an embodiment of the present invention. One or more additional agents may be identified for splitting commission. The current user may be identified at 1710 and one or more additional agents may be identified at 1720. Percentage splits may be entered at 1712 and 1722, where the total of percentage splits equals 100%.

FIG. 18 is an example of a screen shot for a web-based application for gathering pre-interview data, according to an embodiment of the present invention. Initial transaction data may be entered to determine an appropriate application package for a particular client or groups of client. For example, a state of sale may be entered at 1810; a state of delivery may be entered at 1812; a product may be entered at 1814; a plan type may be entered at 1816; a funding data may be entered at 1818; an expected premium may be entered at 1820; an annuitant's date of birth may be entered at 1822; and/or other initial transaction data may be entered for accurate processing of forms.

After entering pre-interview data via a web-based application of the present invention, the user may disconnect and engage a client in an interview process for gathering client data. The user may receive appropriate templates and available options based on the pre-interview data and/or other sources, which may be stored on a remote user device. The interview process may be occur remotely and disconnected from the web thereby enabling the user to more conveniently gather interview data.

FIG. 19 is an example of a screen shot for a desktop application for gathering product and setup data, according to an embodiment of the present invention. Product and setup data may be gathered from the client. Pre-interview data may be displayed in section 1910. Pre-interview data may include a combination of an insurer identifier, an agent name, a product, a plan and/or other similar pre-interview data.

Depending on pre-populated data and other sources of information, the product and setup screen of FIG. 19 may be customized for efficient data input. Certain fields may be pre-populated from pre-interview data and/or other sources of information. For example, a state of sale 1914, a date of sale 1916, an annuitant's date of birth 1918 and an expected total premium may be pre-populated from pre-interview data. The user may then enter specific location data, such as a city of sale at 1912. Based on the annuitant's age, one or more basic riders may be required or not required, as shown in 1922 and 1924. A plan type 1926 may also be pre-populated from pre-interview data gathered via the web-based application. A transfer type may be selected or entered at 1928. An ownership type may also be selected or entered at 1930.

FIG. 20 is an example of a screen shot for a desktop application for gathering ownership data, according to an embodiment of the present invention. Primary owner data may be entered. Primary owner data may include a name 2010, a gender 2012, a date of birth 2014, a social security number 2016, a phone number 2018, a street address 2020, a city 2022, a state 2024 and a zip 2026. Individual or joint ownership may be specified at 2028. If joint ownership is specified, joint owner data may be entered. Join owner data may include a name 2030, a gender 2032, a date of birth 2034, a social security number 2036, and a phone number 2038. If the joint owner's address is not the same as the primary owner's address, as indicated at 2040, joint owner address may be entered, which may include a street address 2042, a city 2044, a state 2046 and a zip 2048.

FIG. 21 is an example of a screen shot for a desktop application for gathering annuitant data, according to an embodiment of the present invention. The user may specify whether the annuitant is the same as the owner, at 2110. If the annuitant is the same as the owner, additional information is not required. If the annuitant is not the same as the owner, annuitant data may be entered. Annuitant data may include a name 2112, a gender 2114, a date of birth 2116, a social security number 2118, a phone number 2120, a street address 2122, a city 2124, a state 2126 and a zip 2128. In some cases, joint annuitants may not be available, as indicated by 2130.

FIG. 22 is an example of a screen shot for a desktop application for gathering beneficiary setup data, according to an embodiment of the present invention. Beneficiary data may be entered. A notification message to the user may indicate that any combination of one or more primary and contingent beneficiaries 2210 may be selected, totaling a predetermined maximum number, such as six. Further, the user may be notified of a minimum number (e.g., one) of primary beneficiaries. Beneficiary type data for each beneficiary may be selected at 2212. The possible types of beneficiaries may be based on pre-interview data (e.g., product, plan etc.) and/or other information. Beneficiary name may be entered at 2214. A percentage allocated to each beneficiary may be entered at 2216, where the total amount allocated may equal 100%. Irrevocability of beneficiary designations may be established at 2218.

FIG. 23 is an example of a screen shot for a desktop application for gathering initial investment allocation data, according to an embodiment of the present invention. An expected premium may be displayed at 2320. Fixed funds, equity funds and other types of funds 2310 may be identified. Fund type may be selected at 2312 where possible fund selections may be based on pre-interview data and/or other sources of information. A percentage allocated to each fund may be entered at 2314. In addition, an equivalent amount may be calculated and displayed (or entered) at 2316. Balance data may be entered (or displayed) at 2318.

FIGS. 24-30 are flowcharts illustrating details of steps performed in a method for accessing a web-based application for inputting pre-interview data (e.g., FIG. 3), according to an embodiment of the present invention.

At step 2410, an agent or other user may access a website of the present invention. At step 2412, the user may click on a link for initiating steps of the web-based application. At step 2414, the user may be transported to a landing page where an authentication process may be invoked. The authentication process may include a single sign on, which may involve secure website access functionality which authenticates a user to use services provided by an entity (e.g., a financial entity). At step 2416, it may be determined whether the user is authenticated. If not, the user may be identified as a new user, at step 2418. A registration script prompt may be initiated to generate an identifier and password, at step 2422. At step 2420, the user may enter the user's identifier and password. At step 2424, the authentication process may be complete.

At step 2426, an agent identification field may be verified. For example, it may be determined whether an agent has been identified as an employee (or other status). If not, the agent may be connected to the agent's use case. If the agent has been identified as an employee (or other status), the user may select a variable annuity option, at step 2430. In addition, a writing code requirement may be disabled. It may be determined whether a desktop tool exists by reading a registry key, at step 2432. If not, the user may be connected to an application server, at step 2434. The latest version of the tool may be downloaded with a setup.exe and front.exe from the application server, at step 2436. The tool may then be automatically installed on the user's desktop device, at step 2438. If the tool has been determined to exist at the desktop level at step 2432, the user may be taken to a user input screen. This screen may allow the user to enter an agents writing code, social security number, and/or last/first name combination, at step 2440.

At step 2510, it may be determined whether the user input at step 2440 is a new item. If not, a box may be checked to re-enter the applicant identifier, at step 2512. At step 2514, the applicant identifier may be re-entered. If the user input at step 2440 is a new item, the user may enter a writing code, social security number or part or all of the user's name, at step 2516. Other types of identification may be entered. At step 2518, the user may provide updates. For example, an applicant's checklist may updated after physically reviewing paperwork received. At step 2520, the user may advance to the next screen.

A validation may be run to ensure required fields have been populated, at step 2522. A validation order may include ensuring that 1.) writing code is populated; 2.) social security number is populated, and 3.) name is populated. Other validation orders may be implemented. If the required fields are not populated, an error message may be displayed at step 2524. The error message may inform the user that a valid writing code, social security number or agent name must be entered.

At step 2526, a validation may be run to ensure all items in an applicant checklist are marked. If not, an error message may be displayed at step 2528. The error message may inform the user that list items are not validated. At step 2530, it may be determined if an application is not in good order (NIGO). For example, NIGO may represent an application that contains errors and may deter or prohibit an entity (e.g., a financial entity) from investing in funds received timely. A selected applicant identifier may be re-entered, at step 2530. At step 2532, a do not create applicant identifier may be executed where the applicant identifier may be compared against an application database table (e.g., Va_Transaction_Detail). At step 2534, if may be determined whether a match exists. If not, an error message may be displayed at step 2536 and the user may be directed to re-enter the applicant identifier. If NIGO does not apply, a create application identifier may be executed using a transaction associate (TA) prefix for internal associates, at step 2538. A transaction associate may indicate that the associate is an internal associate. Other prefixes may be applied to indicate different associate status.

At step 2610, a query may be sent to Channel Servicing Engine (CSE) with agent data, which may include social security numbers and other data. A CSE may include a database that stores relationship information among a combination of agent, broker, agency, and/or firm that may be used to determine at a specific level what information may be allowed to be utilized by customers and/or other entities. At step 2612, a validation may be run to ensure agent status. At step 2614, a validation may be run to ensure company code. For example, the validation of step 2614 may be run to ensure a company code does not equal Federal Home Life (FHL). At step 2616, a validation may be run to ensure agent code. For example, the validation of step 2616 may be run to ensure an agent code does not equal Federal Home Life (000FHL). At step 2618, a validation may be run to ensure channel code does not equal Broker Group Agency (BGA), Long Term Product (LTP) or Asset Management Systems (AMS). For example, a BGA and LTP may represent a channel described in CSE above. AMS may include a business that sells mutual fund (or other) products, for example.

An error message may be displayed at 2620 if at least one of the validation steps is unsuccessful. The user may then be routed back to a welcome screen, at step 2622. If validation is successful, it may be determined whether a match is found, at step 2624. If only one match is found (e.g., no multiple matches), a query may be made to CSE to return license/appointment information, at step 2630. Otherwise, an agent selection page may be displayed at step 2626. For example, agent name, agency and writing may be displayed.

Other information may also be displayed. At step 2628, a user may select a single agent and advance to a next screen. A query may be made to CSE to return license/appointment information, at step 2630.

At step 2632, a validation may be run to ensure license expiration is not equal to a null value. At step 2634, a validation may be run to ensure product group is not of a specific type. At step 2636, a validation may be run to ensure license pending status. An error message may be displayed at 2638 if at least one of the validation steps is unsuccessful. The user may then be routed back to a welcome screen, at step 2640. If validation is successful, an agent confirmation page may be displayed at step 2642. For example, the agent confirmation page may display one or more of writing code, agent name, agency name, agent address, states currently appointed, effective dates, and expiration dates. In addition, the agent confirmation page may provide a split commission option.

At step 2644, it may be determined whether a split commission applies or is needed. If so, additional agents may be entered at step 2646. For example, the user may enter social security number and/or other identifier of one or more additional agents. At step 2648, a validation may be run to ensure social security number (or other identifier) is populated. If not, an error message may be displayed to prompt the user, at step 2650.

If the validation step of 2648 is successful, a query may be sent to CSE with agent data (e.g., social security number), at step 2710. At step 2712, a validation may be run to ensure agent status. At step 2714, a validation may be run to ensure a company code is not equal to FHL. At step 2716, a validation may be run to ensure an agent code is not equal to Federal Home Life (e.g., 000FHL). At step 2718, a validation may be run to ensure a channel code is not equal to BGA, LTP, or AMS. An error message may be displayed at 2720 if at least one of the validation steps is unsuccessful. The user may then be routed back to a welcome screen, at step 2722. If validation is successful, a query may be made to CSE to return license/appointment information, at step 2724.

At step 2726, a validation may be run to ensure license expiration is not equal to a null value. At step 2728, a validation may be run to ensure product group is not of a specific type. At step 2730, a validation may be run to ensure license pending status. An error message may be displayed at 2732 if at least one of the validation steps is unsuccessful. The user may then be routed back to a welcome screen, at step 2734. If validation is successful, additional agent details may be displayed at step 2736. For example, primary agents name, agency name, channel description and other data may be displayed at step 2736. As the user enters percentage values for alternative agents, the primary agent's percentage may be accordingly decreased, thereby ensuring that a total percentage is equal to 100%. The user may also have the option to cancel a selection. A validation may be run to ensure percentage split equals 100%, at step 2738.

If a split in commission is not applicable, a pre interview screen may be displayed at step 2740. Various data elements may be collected. Possible data elements displayed on a drop down may depend on a rules database (or other database). For example, possible data elements may include application signed state, state of delivery, product, plan, funding, expected premium, annuitants date of birth and/or other elements. An output may include an XML data feed. An application identifier may also be displayed.

At step 2810, a query may be made to CSE to return license/appointment information. At step 2812, a validation may be run to ensure license expiration is not equal to a null value. At step 2814, a validation may be run to ensure product group is not of a specific type. At step 2816, a validation may be run to ensure license pending status. An error message may be displayed at 2818 if at least one of the validation steps is unsuccessful. The user may then be routed back to a welcome screen, at step 2820.

If validation is successful, a drop down box may be displayed at step 2822. For example, all states where an agent is appointed may be shown. All states with a state restriction may be shown as restricted. All other states may be shown as not restricted. Other criteria may be displayed. The user may select a state at which an application was signed, at step 2824. At step 2826, a drop down may be populated with states requesting user input, such as a state the contract is to be delivered. The default may be to a previously selected state, for example. Edits may be allowed. At step 2828, the user may select an applicable state the contract is to be delivered. At step 2830, product choices may be populated from a database. In addition, firm approval and product availability may be displayed in a drop down box based upon a signed state (e.g., a state at which a contract was signed) as previously selected. At step 2832, approved products may be displayed. Steps 2824 through step 2832 may involve retrieving, manipulating and/or storing data from a server side database 2850.

At step 2834, a drop down may be populated with possible plan types. For example, plan types may be retrieved from a previously established table. At step 2836, the user may select an applicable plan type. At step 2838, a drop down may be populated with possible funding types. For example, funding types may be retrieved from a previously established table. At step 2840, the user may select an applicable funding type. At step 2844, the user may enter an annuitant's date of birth. At step 2846, the user may enter an expected premium. Steps 2834, 2838 and 2846 may involve retrieving, manipulating and/or storing data from database 2848.

At step 2910, a user may choose to proceed to a next screen which may further involve invoking a validation process. If not, the user may select cancel at step 2912. For example, an application identifier may be stored in a database with NIGO status. At step 2914, the user may be routed back to a welcome screen.

Various validation steps may be performed. For example, a state validation may be performed at step 2916, which may involve identifying appointed or non restricted states. If the validation fails, an error message may be displayed at step 2918. The error message may inform the user that the application signed state is not available.

A product validation may be performed at step 2920, which may involve accessing state approval and firm approval tables. If the validation fails, an error message may be displayed at step 2922. The error message may inform the user that a broker/agent firm has not approved product for sale or a product broker selected is not available in the particular state.

A funding type validation may be performed at step 2924, which may involve matching plan types selected. If the validation fails, an error message may be displayed at step 2926. The error message may inform the user that the funding type the user is trying to enter is not available.

Age validation may be performed at step 2928, which may involve accessing a restriction table. If the validation fails, an error message may be displayed at step 2930. The error message may inform the user that the annuitant's age does not meet minimum guidelines as stated in a particular prospectus.

Premium validation may be performed at step 2932, which may involve accessing a minimum maximum table. If the validation fails, it may be determined if the amount is above a maximum, at step 2934. An error message may be displayed at step 2936, informing the user that the premium entered does not meet minimum requirements outlined in a particular prospectus. If the amount is above the maximum, a warning message may be displayed, at step 2938. For example, the user may be informed that the premium amount exceeds the maximum in the prospectus. The user may be instructed to review the amount and other data for accuracy. If the amount is correct, the user may continue and be instructed to follow maximum premium procedures.

At step 2940, it may be determined whether all validations have passed. If not, a list of error message may be displayed at step 2942. Incorrect fields may be highlighted. For example, the user may be prompted to correct errors and re-validate, starting at step 2822. In addition, the user may select cancel to end, at which point the user may taken to step 2912 or step 2948 below.

If it has been determined that all validations have passed, at step 2940, a data file for the present transaction may be prepared at step 2944. The data file may include information related to sales state, delivery state, product, plan fund, annuitant age, premium as well as CSE data. Other information may also be included. At step 2946, the data may be downloaded and stored in data.xml on the user's desktop device in a folder, such as informed/temp folder. At step 2948, data may be stored on a database, which may include applicant identifier, user identifier, agent name, agency name, date/time created, NIGO status as well as other data. At step 2950, desktop filler and a state specific template may be launched. In particular, the filler may read the temp folder and populate the template with data from the xml file.

At step 3010, the user may execute a send function from the interview to a financial entity or other entity. At step 3012, a servlet may be invoked. In addition, output.xml, applicant identifier and user identifier may be received. At step 3014, it may be determined if process passes are to be submitted. If not, data invalid messages may be displayed for a variety of situations, at step 3016. Otherwise, the user may be informed that the transfer of data was successful, at step 3018. At step 3020, xml data may be transferred to a database. In addition, user identifier, application identifier along with a submit date may be stored. A chronological job may be executed automatically at periodic intervals (e.g., 15 minutes) to convert data to Electronic Data Interchange (EDI) format and File Transfer Protocol (FTP) to a specific database (e.g., DB08 transcend) using an assigned naming convention, at step 3022. Data may be stored in a transactional database, at step 3024. Step 3026 signifies an end of the process.

As is clear from the Detailed Description, the system and method of the present invention provides an easy, user-friendly, efficient means for generating electronic forms for purchasing financial products.

Other embodiments, uses and advantages of the present invention will be apparent to those skilled in the art from consideration of the specification and practice of the invention disclosed herein. The specification and examples should be considered exemplary only. The intended scope of the invention is only limited by the claims appended hereto.

What is claimed is:

1. A computer-implemented method that includes generating a set of electronic forms to effect a purchase of at least one financial product, the method implemented by a server operably connected to a database, the method comprising the steps of:
    providing a web-based application, by the server, enabling a user to provide a financial product to a client;
    enabling the user, by the server, to establish a connection between the server and the web-based application;
    gathering, by the server, pre-interview data from the user;
    generating, by the server, a plurality of transaction templates based on the pre-interview data to facilitate client data entry by the user;
    presenting, by the server, the transaction templates to the user to enable the user, working remotely and disconnected from the server, to gather interview data from a remote client;
    disconnecting, by the server, from the web-based application;
    and the enabling the user to gather interview data from a remote client constituted by such gathering performed:
        (1) as prompted by the transaction templates, and
        (2) performed in conjunction with the purchase of the at least one financial product during a disconnect stage, such disconnect stage constituted by a state of non-connection between the server and the web-based application;
    enabling the user, by the server, to again establish a connection to the web-based application;
    inputting, by the server, the interview data;
    generating a set of electronic forms, by the server, in conjunction with the purchase of the at least one financial product, and
        the generating the set of electronic forms being performed based on the interview data that was input from the user.

2. The computer-implemented method of claim 1 wherein the financial product comprises one or more of a variable annuity and a fixed annuity.

3. The computer-implemented method of claim 1 wherein the pre-interview data comprises one or more of a user identification and split commission data.

4. The computer-implemented method of claim 1 wherein the pre-interview data comprises one or more of state signed data, state delivered data, product data, plan type data, funding type data, annuitant data and expected premium data.

5. The computer-implemented method of claim 1 wherein the step of interviewing a client further comprises a step of collecting one or more of product information, client information, beneficiary information, annuitant information, investment information, systematic withdrawal information, service options information and exchange replacement data.

6. The computer-implemented method of claim 1 wherein the transaction templates are stored on a remote user device.

* * * * *